United States Patent
Lin et al.

(10) Patent No.: US 10,269,278 B2
(45) Date of Patent: Apr. 23, 2019

(54) EDGE COLUMN DIFFERENTIAL SENSING SYSTEMS AND METHODS

(71) Applicant: Apple Inc., Cupertino, CA (US)

(72) Inventors: Hung Sheng Lin, San Jose, CA (US); Hyunwoo Nho, Stanford, CA (US); Shengkui Gao, San Jose, CA (US); Jesse A. Richmond, San Francisco, CA (US); Jie Won Ryu, Campbell, CA (US); Junhua Tan, Santa Clara, CA (US); Kingsuk Brahma, Mountain View, CA (US); Mohammad B. Vahid Far, San Jose, CA (US); Sun-Il Chang, San Jose, CA (US); Yafei Bi, Los Altos Hills, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/694,373

(22) Filed: Sep. 1, 2017

(65) Prior Publication Data

US 2018/0090042 A1 Mar. 29, 2018

Related U.S. Application Data

(60) Provisional application No. 62/398,902, filed on Sep. 23, 2016.

(51) Int. Cl.
*G09G 3/00* (2006.01)
*G09G 3/20* (2006.01)
*G06F 3/041* (2006.01)
*G09G 3/3225* (2016.01)

(52) U.S. Cl.
CPC ............... *G09G 3/006* (2013.01); *G09G 3/20* (2013.01); *G09G 3/2096* (2013.01); *G06F 3/041* (2013.01); *G09G 3/3225* (2013.01); *G09G 2300/0413* (2013.01); *G09G 2310/0291* (2013.01); *G09G 2320/0295* (2013.01); *G09G 2320/041* (2013.01); *G09G 2320/043* (2013.01); *G09G 2330/06* (2013.01); *G09G 2330/12* (2013.01)

(58) Field of Classification Search
None
See application file for complete search history.

(56) References Cited

U.S. PATENT DOCUMENTS

| 2012/0075224 A1 | 3/2012 | Chang et al. |
| 2012/0182252 A1 | 7/2012 | Brosnan et al. |
| 2013/0141372 A1 | 6/2013 | Kang |
| 2013/0285965 A1 | 10/2013 | Goo et al. |

(Continued)

OTHER PUBLICATIONS

International Search Report and Written Opinion for PCT Application No. PCT/US2017/050116 dated Nov. 9, 2017; 14 pgs.

*Primary Examiner* — Nicholas J Lee
(74) *Attorney, Agent, or Firm* — Fletcher Yoder PC

(57) ABSTRACT

Electronic displays, systems, and methods that perform display panel sensing are provided. An electronic device may include processing circuitry that generates image data based at least in part on display panel sensing feedback and an electronic display. The electronic display may display the image data on pixels coupled to one of several sense lines. There may be an odd number of sense lines with common electrical characteristics. The electronic display may obtain display panel sense feedback at least in part by differentially sensing each one of the sense lines with sense lines with common electrical characteristics with another one of the sense lines the common electrical characteristics.

19 Claims, 22 Drawing Sheets

(56) References Cited

U.S. PATENT DOCUMENTS

| | | |
|---|---|---|
| 2015/0062040 A1 | 3/2015 | Park et al. |
| 2016/0086540 A1 | 3/2016 | Kim |
| 2016/0188085 A1 | 6/2016 | Leigh et al. |
| 2016/0291766 A1 | 10/2016 | Shen et al. |

EDGE COLUMN DIFFERENTIAL SENSING SYSTEMS AND METHODS

CROSS REFERENCE TO RELATED APPLICATIONS

This application is a Non-Provisional Patent Application of U.S. Provisional Patent Application No. 62/398,902, entitled "Edge Column Differential Sensing Systems and Methods", filed Sep. 23, 2016, which is herein incorporated by reference in its entirety for all purposes.

BACKGROUND

This disclosure relates to display panel sensing to compensate for operational variations in the display panel and, more particularly, to reducing or eliminating common-mode display panel noise on display panels odd numbers of electrically similar columns.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays are found in numerous electronic devices. As electronic displays gain higher resolutions that provide finer, more detailed images at higher dynamic ranges and a broader range of colors, the fidelity of the images becomes more valuable. To ensure the fidelity of the images displayed on an electronic display, display panel sensing may be used to sense operational variations in the pixels of an electronic display. These operational variations may be due to factors such as temperature or aging. Since factors such as temperature and aging tend to be non-uniform across the electronic display, a single uniform compensation may be insufficient to correct for image artifacts that would appear due to the operational variations of the electronic display. Display panel sensing may identify the variations across the display to enable more precise image compensation.

Some electronic displays use single-ended display panel sensing, where parameters of the electronic display are sensed in comparison to a fixed reference value. While single-ended display panel sensing may work for electronic displays that are very large and thus have a relatively low pixel density, using single-ended display panel sensing on electronic displays that are smaller with a greater pixel density may result in the detection of a substantial amount of noise. The amount of noise may be further increased by other electronic components that may be operating near the display, which may frequently occur in portable electronic devices, such as portable phones. Indeed, processors, cameras, wireless transmitters, and similar components could produce electromagnetic interference that interferes with display panel sensing.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A number of systems and methods may be used to mitigate the effects of noise in display panel sensing. For example, differential sensing may be used to cancel out common mode noise of the display panel during sensing. Differential sensing involves performing display panel sensing not in comparison to a static reference, as is done in single-ended sensing, but instead in comparison to a dynamic reference that is exposed to similar electrical conditions as what is being tested. For example, to sense an operational parameter of a test pixel of an electronic display, the test pixel may be programmed with test data. The response by the test pixel to the test data may be sensed on a sense line (e.g., a data line) that is coupled to the test pixel. The sense line of the test pixel may be sensed in comparison to a sense line coupled to a reference pixel that was not programmed with the test data. The signal sensed from the reference pixel does not include any particular operational parameters relating to the reference pixel in particular, but rather contains common-noise that may be occurring on the sense lines of both the test pixel and the reference pixel. In other words, since the test pixel and the reference signal are both subject to the same system-level noise—such as electromagnetic interference from nearby components or external interference—differentially sensing the test pixel in comparison to the reference pixel results in at least some of the common-mode noise subtracted away from the signal of the test pixel.

It may be beneficial to perform differential sensing using two lines with similar electrical characteristics. For example, every other sense line may have electrical characteristics that are more similar than adjacent sense lines. An electronic display panel with an odd number of electrically similar sense lines may not perform differential sensing with every other sense line without having one remaining sense line that is left out.

Accordingly, this disclosure provides systems and methods to enable differential sensing of sense lines in a display panel even when the display panel contains odd numbers of electrically similar sense lines. In one example, some or all of the sense lines may be routed to sense amplifiers be differentially sensed with different sense lines at different points in time. These may be considered to be "dancing channels" that are not fixed in place, but rather may dance from sense amplifier to sense amplifier in a way that mitigates odd pairings.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
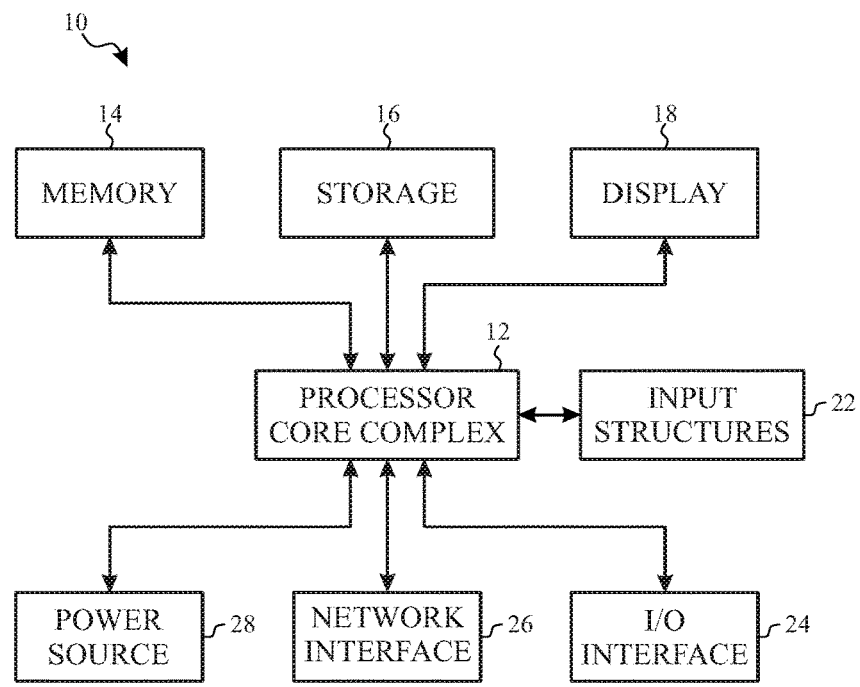
FIG. 1 is a schematic block diagram of an electronic device that performs display sensing and compensation, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic displays are becoming ubiquitous in modern electronic devices. As electronic displays gain ever-higher resolutions and dynamic range capabilities, image quality has increasingly grown in value. In general, electronic displays contain numerous picture elements, or "pixels," that are programmed with image data. Each pixel emits a particular amount of light based on the image data. By programming different pixels with different image data, graphical content including images, videos, and text can be displayed.

As mentioned above, display panel sensing allows for operational properties of pixels of an electronic display to be identified to improve the performance of the electronic display. For example, variations in temperature and pixel aging (among other things) across the electronic display cause pixels in different locations on the display to behave differently. Indeed, the same image data programmed on different pixels of the display could appear to be different due to the variations in temperature and pixel aging. Without appropriate compensation, these variations could produce undesirable visual artifacts. By sensing certain operational properties of the pixels, the image data may be adjusted to compensate for the operational variations across the display.

Display panel sensing involves programming certain pixels with test data and measuring a response by the pixels to the test data. The response by a pixel to test data may indicate how that pixel will perform when programmed with actual image data. In this disclosure, pixels that are currently being tested using the test data are referred to as "test pixels" and the response by the test pixels to the test data is referred to as a "test signal." The test signal is sensed from a "sense line" of the electronic display and may be a voltage or a current, or both a voltage and a current. In some cases, the sense line may serve a dual purpose on the display panel. For example, data lines of the display that are used to program pixels of the display with image data may also serve as sense lines during display panel sensing.

To sense the test signal, it may be compared to some reference value. Although the reference value could be static—referred to as "single-ended" testing—using a static reference value may cause too much noise to remain in the test signal. Indeed, the test signal often contains both the signal of interest, which may be referred to as the "pixel operational parameter" or "electrical property" that is being sensed, as well as noise due to any number of electromagnetic interference sources near the sense line. Differential sensing (DS) may be used to cancel out common mode noise of the display panel during sensing.

Differential sensing involves performing display panel sensing not in comparison to a static reference, as is done in single-ended sensing, but instead in comparison to a dynamic reference. For example, to sense an operational parameter of a test pixel of an electronic display, the test pixel may be programmed with test data. The response by the test pixel to the test data may be sensed on a sense line (e.g., a data line) that is coupled to the test pixel. The sense line of the test pixel may be sensed in comparison to a sense line coupled to a reference pixel that was not programmed with the test data. The signal sensed from the reference pixel does not include any particular operational parameters relating to the reference pixel in particular, but rather contains common-noise that may be occurring on the sense lines of both the test pixel and the reference pixel. In other words, since the test pixel and the reference signal are both subject to the same system-level noise—such as electromagnetic interference from nearby components or external interference—differentially sensing the test pixel in comparison to the reference pixel results in at least some of the common-mode noise being subtracted away from the signal of the test pixel. The resulting differential sensing may be used in combination with other techniques, such as difference—differential sensing, correlated double sampling, and the like. A variety of these techniques are described in U.S. patent application Ser. No. 15/698,262 filed on Sep. 7, 2017 and entitled "Noise Mitigation For Display Panel Sensing", which claims priority to U.S. patent application Ser. No. 62/397,845, filed Sep. 21, 2016 and entitled "Noise Mitigation for Display Panel Sensing," which is incorporated by reference herein in its entirety for all purposes.

It may be beneficial to perform differential sensing using two lines with similar electrical characteristics. For example, every other sense line may have electrical characteristics that are more similar than adjacent sense lines. An electronic display panel with an odd number of electrically similar sense lines may not perform differential sensing with every other sense line without having one remaining sense line that is left out. Accordingly, this disclosure provides systems and methods to enable differential sensing of sense lines in a display panel even when the display panel contains odd numbers of electrically similar sense lines. In one example, some or all of the sense lines may be routed to sense amplifiers be differentially sensed with different sense lines at different points in time. These may be considered to be "dancing channels" that are not fixed in place, but rather may dance from sense amplifier to sense amplifier in a way that mitigates odd pairings.

Figure 2:
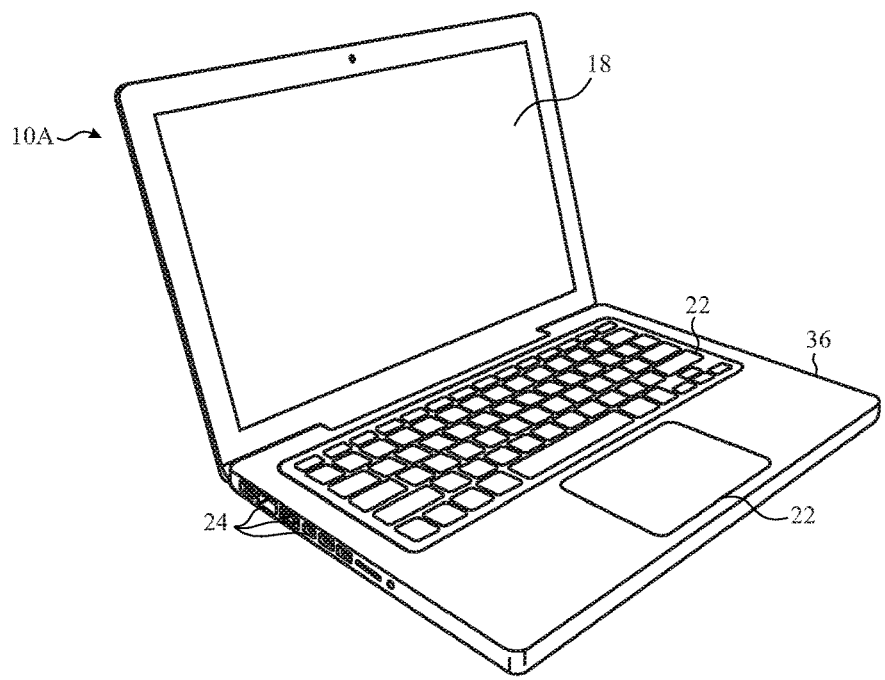
FIG. 2 is a perspective view of a notebook computer representing an embodiment of the electronic device of FIG. 1.
Figure 3:
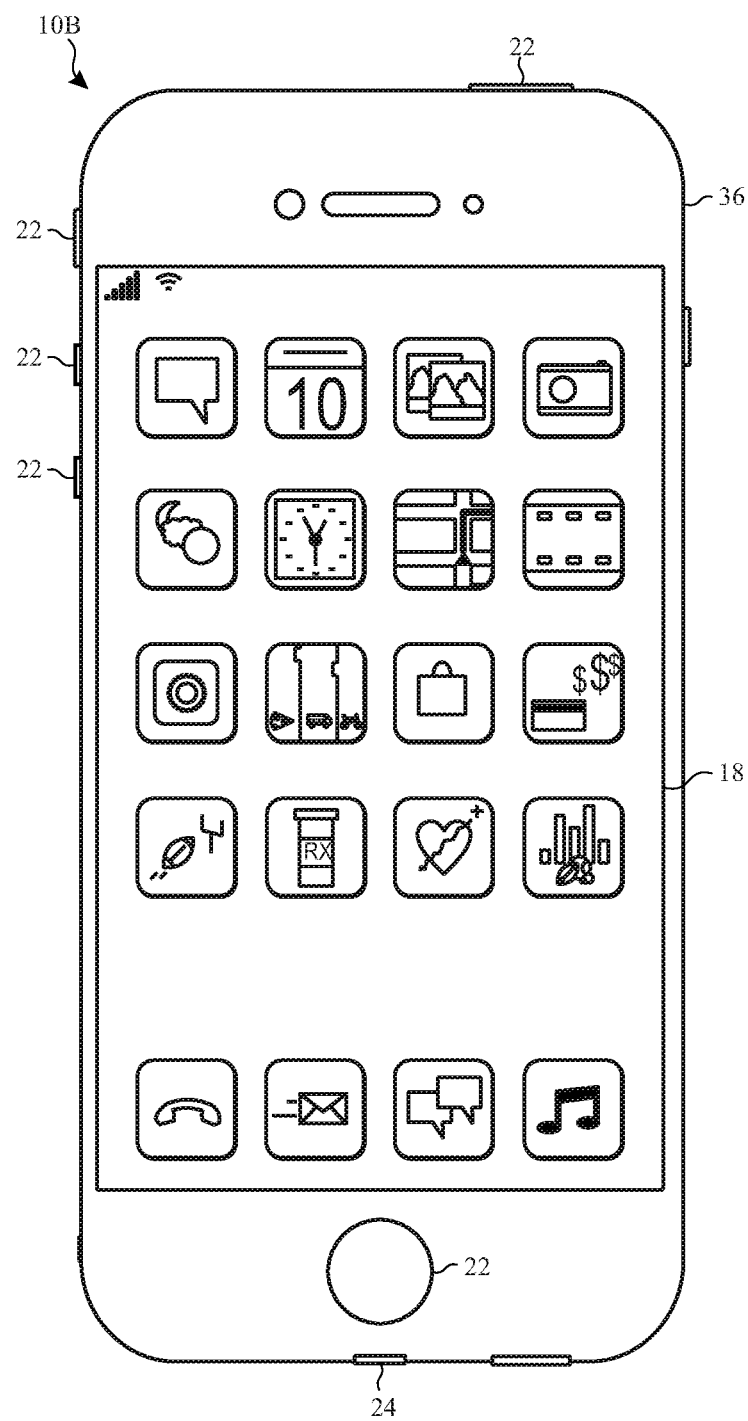
FIG. 3 is a front view of a hand-held device representing another embodiment of the electronic device of FIG. 1.
Figure 4:
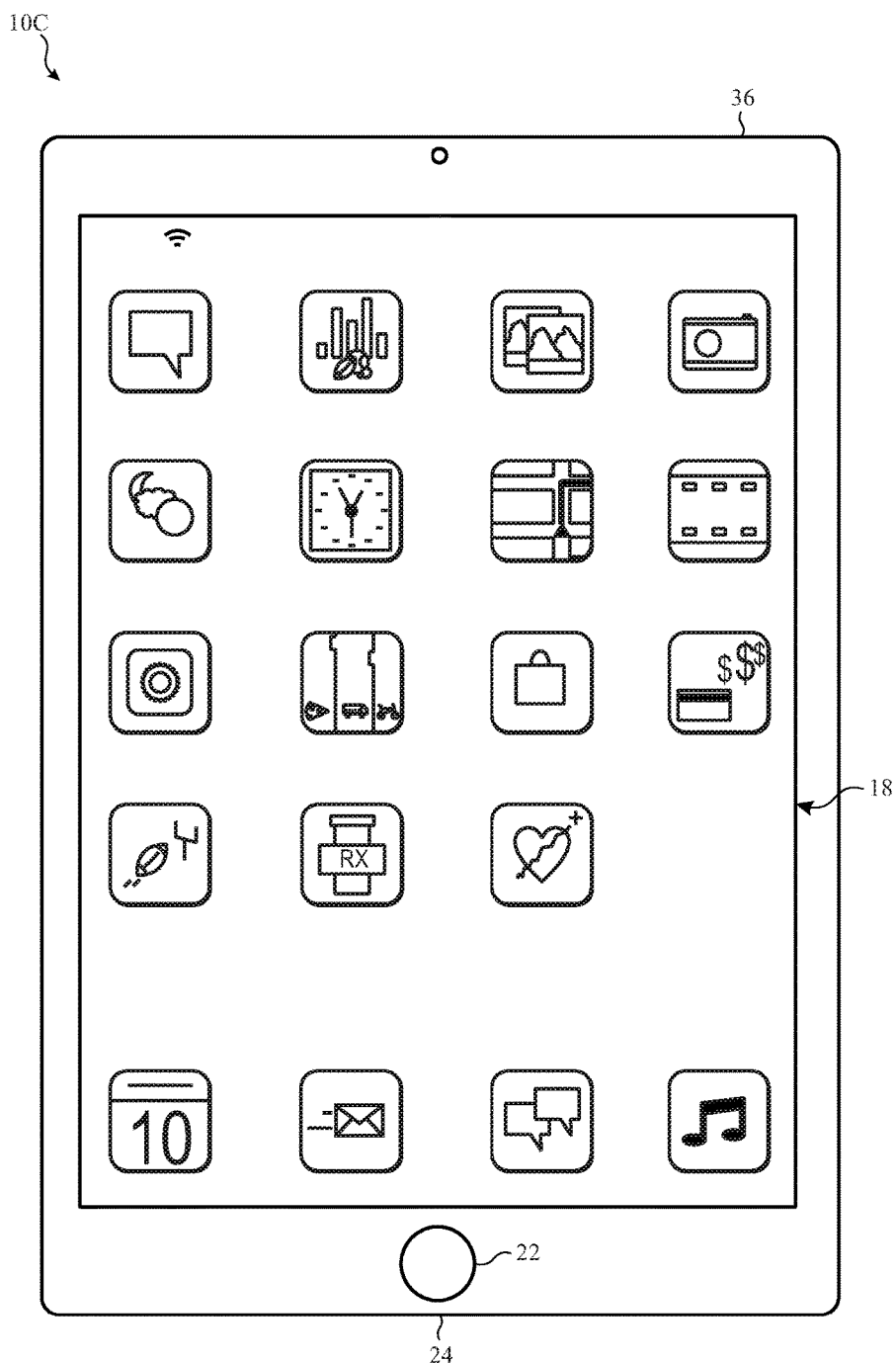
FIG. 4 is a front view of another hand-held device representing another embodiment of the electronic device of FIG. 1.
Figure 5:
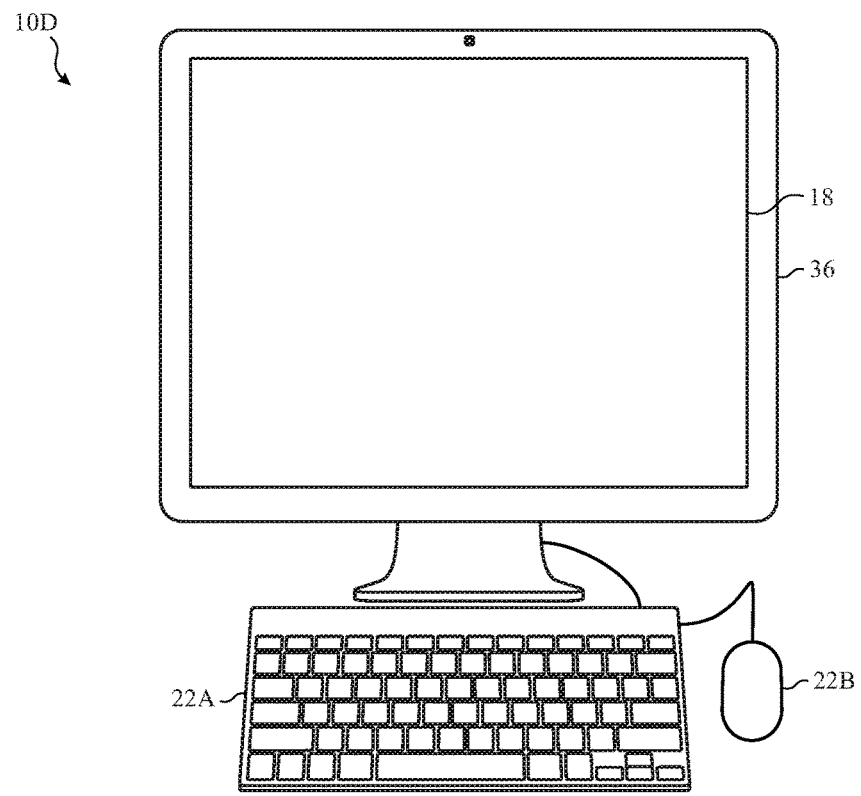
FIG. 5 is a front view of a desktop computer representing another embodiment of the electronic device of FIG. 1.
Figure 6:
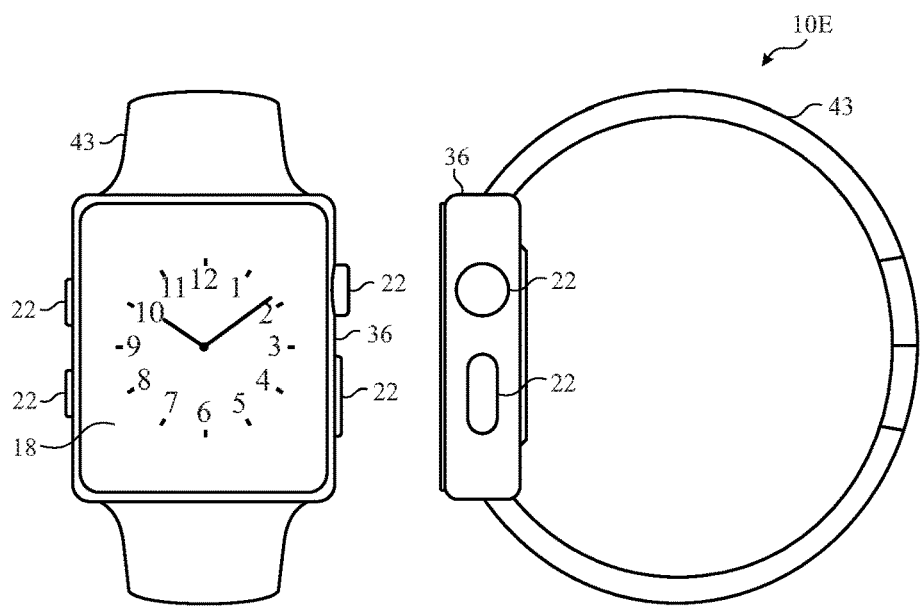
FIG. 6 is a front view and side view of a wearable electronic device representing another embodiment of the electronic device of FIG. 1.

With this in mind, a block diagram of an electronic device 10 is shown in FIG. 1 that may perform differential sensing to reduce display panel sensing noise, even with a display panel having an odd number of electrically similar sense lines. As will be described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or a similar device.

The electronic device 10 shown in FIG. 1 may include, for example, a processor core complex 12, a local memory 14, a main memory storage device 16, a display 18, input structures 22, an input/output (I/O) interface 24, network interfaces 26, and a power source 28. The various functional blocks shown in FIG. 1 may include hardware elements (including circuitry), software elements (including machine-executable instructions stored on a tangible, non-transitory medium, such as the local memory 14 or the main memory storage device 16) or a combination of both hardware and software elements. It should be noted that FIG. 1 is merely one example of a particular implementation and is intended to illustrate the types of components that may be present in electronic device 10. Indeed, the various depicted components may be combined into fewer components or separated into additional components. For example, the local memory 14 and the main memory storage device 16 may be included in a single component.

The processor core complex 12 may carry out a variety of operations of the electronic device 10, such as causing the electronic display 18 to perform display panel sensing and using the feedback to adjust image data for display on the electronic display 18. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

The electronic display 18 may display image frames that may contain a graphical user interface (GUI) for an operating system or an application interface, still images, and/or video content. The processor core complex 12 may supply at least some of the image frames. The electronic display 18 may be a self-emissive display, such as an organic light emitting diodes (OLED) display, or may be a liquid crystal display (LCD) illuminated by a backlight. In some embodiments, the electronic display 18 may include a touch screen, which may allow users to interact with a user interface of the electronic device 10. The electronic display 18 may employ display panel sensing to identify operational variations of the electronic display 18. This may allow the processor core complex 12 to adjust image data that is sent to the electronic display 18 to compensate for these variations, thereby improving the quality of the image frames appearing on the electronic display 18.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra wideband (UWB), alternating current (AC) power lines, and so forth. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, an electronic display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on the electronic display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the electronic display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

User input structures 22, in combination with the electronic display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer or portable computing device. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the electronic display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The electronic display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
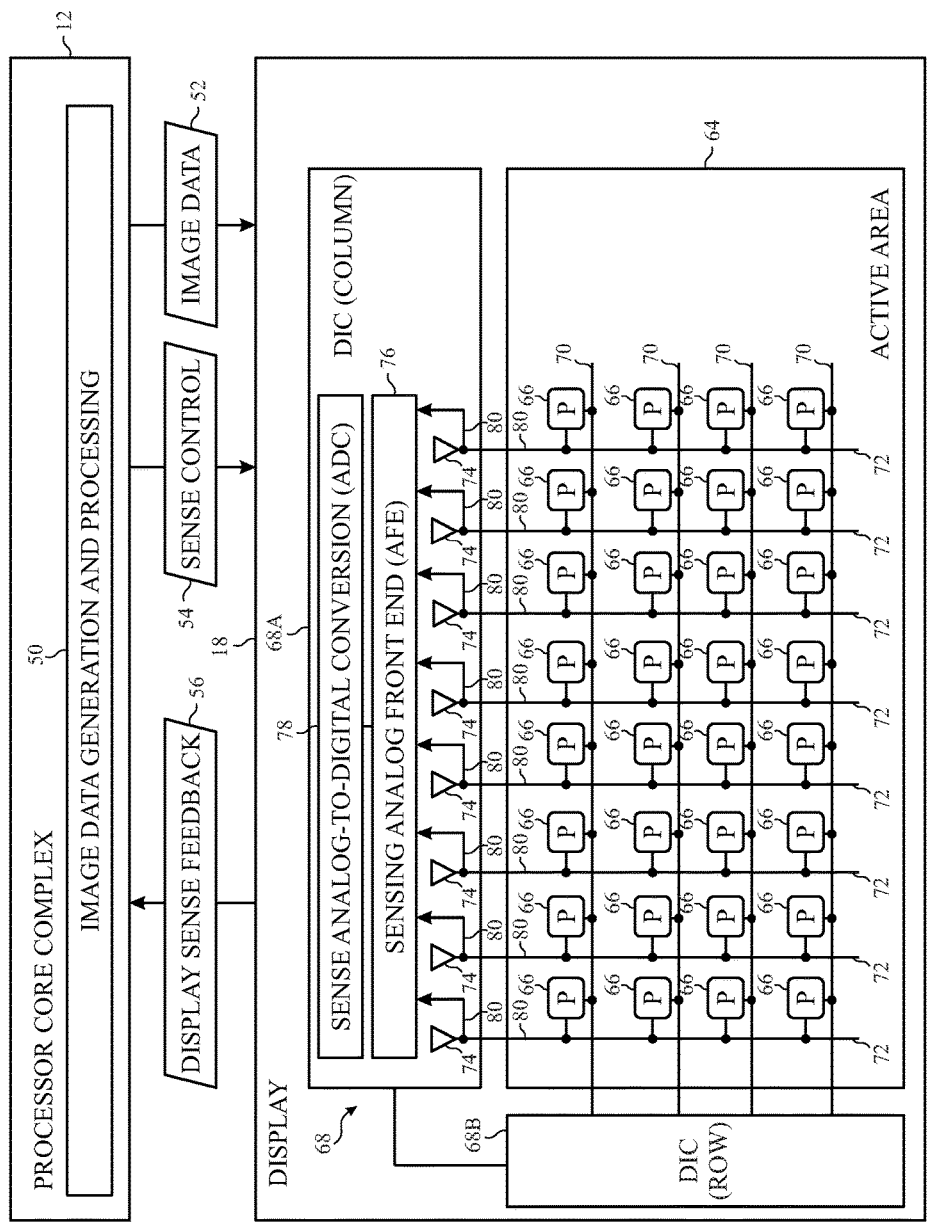
FIG. 7 is a block diagram of an electronic display that performs display panel sensing, in accordance with an embodiment.

As shown in FIG. 7, in the various embodiments of the electronic device 10, the processor core complex 12 may perform image data generation and processing 50 to generate image data 52 for display by the electronic display 18. The image data generation and processing 50 of the processor core complex 12 is meant to represent the various circuitry and processing that may be employed by the core processor 12 to generate the image data 52 and control the electronic display 18. Since this may include compensating the image data 52 based on operational variations of the electronic display 18, the processor core complex 12 may provide sense control signals 54 to cause the electronic display 18 to perform display panel sensing to generate display sense feedback 56. The display sense feedback 56 represents digital information relating to the operational variations of the electronic display 18. The display sense feedback 56 may take any suitable form, and may be converted by the image data generation and processing 50 into a compensation value that, when applied to the image data 52, appropriately compensates the image data 52 for the conditions of the electronic display 18. This results in greater fidelity of the image data 52, reducing or eliminating visual artifacts that would otherwise occur due to the operational variations of the electronic display 18.

The electronic display 18 includes an active area 64 with an array of pixels 66. The pixels 66 are schematically shown distributed substantially equally apart and of the same size, but in an actual implementation, pixels of different colors may have different spatial relationships to one another and may have different sizes. In one example, the pixels 66 may take a red-green-blue (RGB) format with red, green, and blue pixels, and in another example, the pixels 66 may take a red-green-blue-green (RGBG) format in a diamond pattern. The pixels 66 are controlled by a driver integrated circuit 68, which may be a single module or may be made up of separate modules, such as a column driver integrated circuit 68A and a row driver integrated circuit 68B. The driver integrated circuit 68 may send signals across gate lines 70 to cause a row of pixels 66 to become activated and programmable, at which point the driver integrated circuit 68 (e.g., 68A) may transmit image data signals across data lines 72 to program the pixels 66 to display a particular gray level. By supplying different pixels 66 of different colors with image data to display different gray levels or different brightness, full-color images may be programmed into the pixels 66. The image data may be driven to an active row of pixel 66 via source drivers 74, which are also sometimes referred to as column drivers.

As mentioned above, the pixels 66 may be arranged in any suitable layout with the pixels 66 having various colors and/or shapes. For example, the pixels 66 may appear in alternating red, green, and blue in some embodiments, but also may take other arrangements. The other arrangements may include, for example, a red-green-blue-white (RGBW) layout or a diamond pattern layout in which one column of pixels alternates between red and blue and an adjacent column of pixels are green. Regardless of the particular arrangement and layout of the pixels 66, each pixel 66 may be sensitive to changes on the active area of 64 of the electronic display 18, such as variations and temperature of the active area 64, as well as the overall age of the pixel 66. Indeed, when each pixel 66 is a light emitting diode (LED), it may gradually emit less light over time. This effect is referred to as aging, and takes place over a slower time period than the effect of temperature on the pixel 66 of the electronic display 18.

Display panel sensing may be used to obtain the display sense feedback 56, which may enable the processor core complex 12 to generate compensated image data 52 to negate the effects of temperature, aging, and other variations of the active area 64. The driver integrated circuit 68 (e.g., 68A) may include a sensing analog front end (AFE) 76 to perform analog sensing of the response of pixels 66 to test data. The analog signal may be digitized by sensing analog-to-digital conversion circuitry (ADC) 78.

For example, to perform display panel sensing, the electronic display 18 may program one of the pixels 66 with test data. The sensing analog front end 76 then senses a sense line 80 of connected to the pixel 66 that is being tested. Here, the data lines 72 are shown to act as the sense lines 80 of the electronic display 18. In other embodiments, however, the display active area 64 may include other dedicated sense lines 80 or other lines of the display may be used as sense lines 80 instead of the data lines 72. Other pixels 66 that have not been programmed with test data may be sensed at the same time a pixel that has been programmed with test data. Indeed, as will be discussed below, by sensing a reference signal on a sense line 80 when a pixel on that sense line 80 has not been programmed with test data, a common-mode noise reference value may be obtained. This reference signal can be removed from the signal from the test pixel that has been programmed with test data to reduce or eliminate common mode noise.

The analog signal may be digitized by the sensing analog-to-digital conversion circuitry 78. The sensing analog front end 76 and the sensing analog-to-digital conversion circuitry 78 may operate, in effect, as a single unit. The driver integrated circuit 68 (e.g., 68A) may also perform additional digital operations to generate the display feedback 56, such as digital filtering, adding, or subtracting, to generate the display feedback 56, or such processing may be performed by the processor core complex 12.

Figure 8:
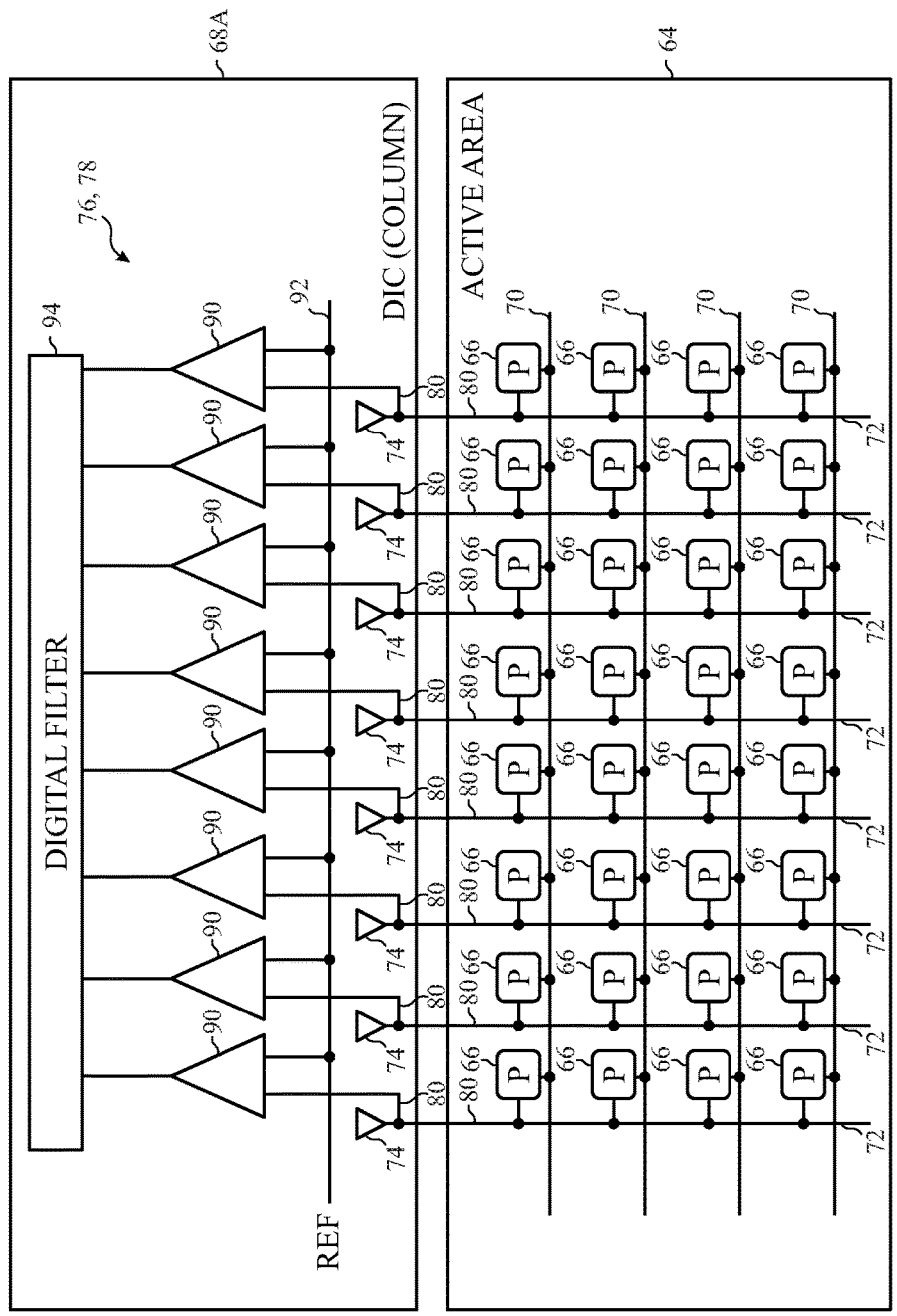
FIG. 8 is a block diagram of single-ended sensing used in combination with a digital filter, in accordance with an embodiment.

FIG. 8 illustrates a single-ended approach to display panel sensing. Namely, the sensing analog front end 76 and the sensing analog-to-digital conversion circuitry 78 may be represented schematically by sense amplifiers 90 that differentially sense a signal from the sense lines 80 (here, the data lines 72) in comparison to a static reference signal 92 and output a digital value. It should be appreciated that, in FIG. 8 as well as other figures of this disclosure, the sense amplifiers 90 are intended to represent both analog amplification circuitry and/or the sense analog to digital conversion (ADC) circuitry 78. Whether the sense amplifiers 90 represent analog or digital circuitry, or both, may be understood through the context of other circuitry in each figure. A digital filter 94 may be used to digitally process the resulting digital signals obtained by the sense amplifiers 90.

Figure 9:
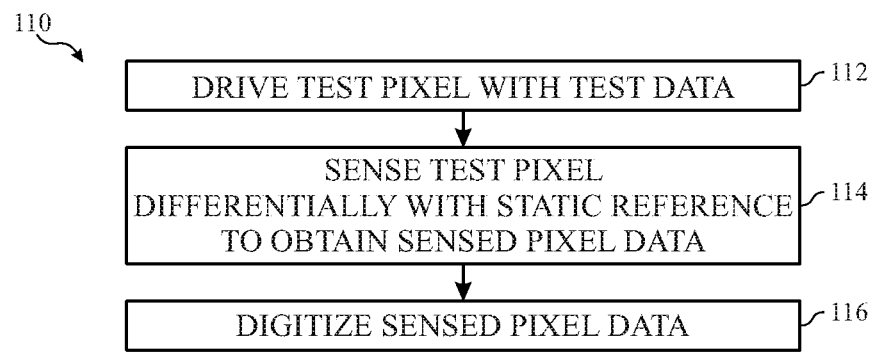
FIG. 9 is a flowchart of a method performing single-ended sensing, in accordance with an embodiment.

The single-ended display panel sensing shown in FIG. 8 may generally follow a process 110 shown in FIG. 9. Namely, a pixel 66 may be driven with test data (referred to as a "test pixel") (block 112). Any suitable pixel 66 may be selected to be driven with the test data. In one example, all of the pixels 66 of a particular row are activated and driven with test pixel data. After the test pixel has been driven with the test data, the differential amplifiers 90 may sense the test pixels differentially in comparison to the static reference signal 92 to obtain sensed test signal data (block 114). The sensed test pixel data may be digitized (block 116) to be filtered by the digital filter 94 or for analysis by the processor core complex 12.

Figure 10:
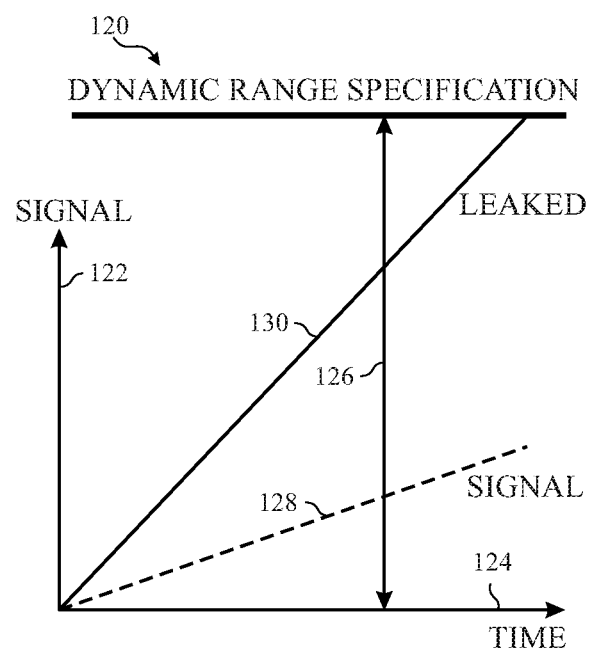
FIG. 10 is a plot illustrating a relationship between signal and noise over time using single-ended sensing, in accordance with an embodiment.

Although the single-ended approach of FIG. 8 may operate to efficiently obtain sensed test pixel data, the sense lines 80 of the active area 64 (e.g., the data lines 72) may be susceptible to noise from the other components of the electronic device 10 or other electrical signals in the vicinity of the electronic device 10, such as radio signals, electromagnetic interference from data processing, and so forth. This may increase an amount of noise in the sensed signal, which may make it difficult to amplify the sensed signal within a specified dynamic range. An example is shown by a plot 120 of FIG. 10. The plot 120 compares the detected signal of the sensed pixel data (ordinate 122) over the sensing time (abscissa 124). Here, a specified dynamic range 126 is dominated not by a desired test pixel signal 128, but rather by leakage noise 130. To cancel out some of the leakage noise 130, and therefore improve the signal-to-noise ratio, an approach other than, or in addition to, a single-ended sensing approach may be used. For example, the electronic display 18 may perform differential sensing to cancel out certain common mode noise.

Figure 11:
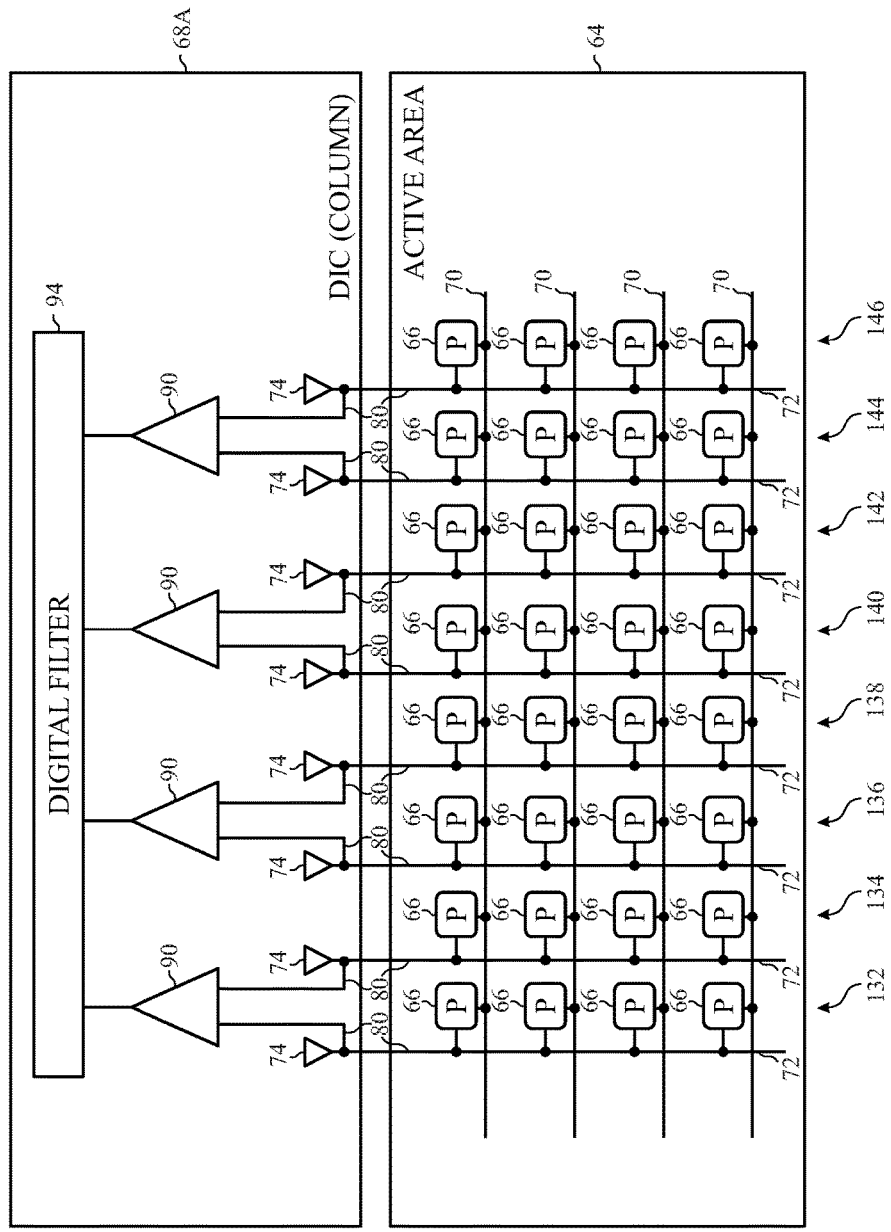
FIG. 11 is a block diagram of differential sensing, in accordance with an embodiment.

Differential sensing involves sensing a test pixel that has been driven with test data in comparison to a reference pixel that has not been applied with test data. By doing so, common-mode noise that is present on the sense lines 80 of both the test pixel and the reference pixel may be excluded. FIGS. 11-15 describe a few differential sensing approaches that may be used by the electronic display 18. In FIG. 11, the electronic display 18 includes sense amplifiers 90 that are connected to differentially sense two sense lines 80. In the example shown in FIG. 11, columns 132 and 134 can be differentially sensed in relation to one another, columns 136 and 138 can be differentially sensed in relation to one another, columns 140 and 142 can be differentially sensed in relation to one another, and columns 144 and 146 can be differentially sensed in relation to one another.

Figure 12:
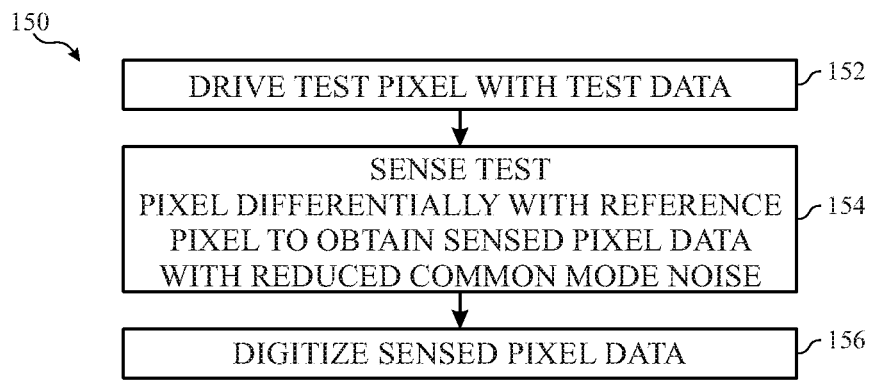
FIG. 12 is a flowchart of a method for performing differential sensing, in accordance with an embodiment.
Figure 13:
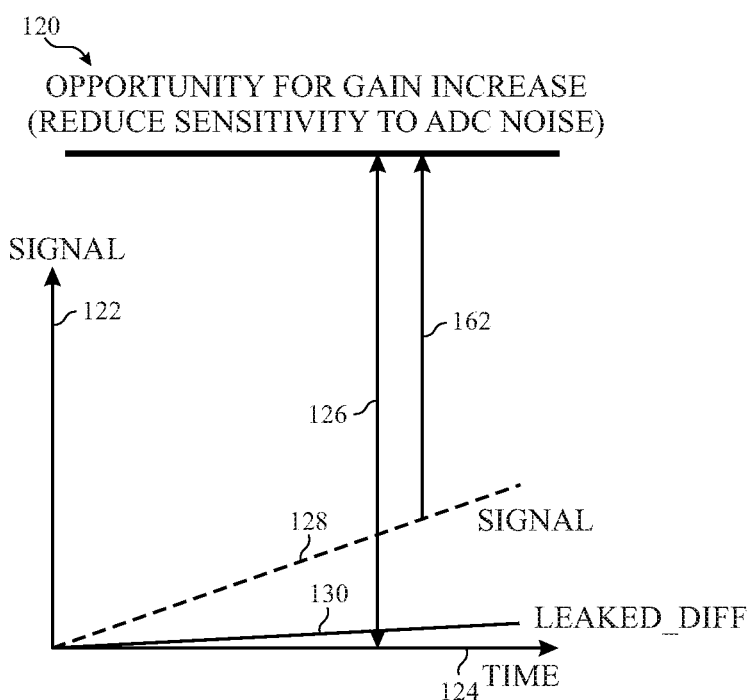
FIG. 13 is a plot of the relationship between signal and noise using differential sensing, in accordance with an embodiment.

As shown by a process 150 of FIG. 12, differential sensing may involve driving a test pixel 66 with test data (block 152). The test pixel 66 may be sensed differentially in relation to a reference pixel or reference sense line 80 that was not driven with test data (block 154). For example, a test pixel 66 may be the first pixel 66 in the first column 132, and the reference pixel 66 may be the first pixel 66 of the second column 134. By sensing the test pixel 66 in this way, the sense amplifier 90 may obtain test pixel 66 data with reduced common-mode noise. The sensed test pixel 66 data may be digitized (block 156) for further filtering or processing.

As a result, the signal-to-noise ratio of the sensed test pixel 66 data may be substantially better using the differential sensing approach than using a single-ended approach. Indeed, this is shown in a plot 160 of FIG. 13, which compares a test signal value (ordinate 122) in comparison to a sensing time (abscissa 124). In the plot 160, even with the same dynamic range specification 126 as shown in the plot 120 of FIG. 10, the desired test pixel signal 128 may be much higher than the leakage noise 130. This is because the common-mode noise that is common to the sense lines 80 of both the test pixel 66 and the reference pixel 66 may be subtracted when the differential amplifier 90 compares the test signal to the reference signal. This also provides an opportunity to increase the gain of the signal 128 by providing additional headroom 162 between the desired test pixel signal 128 and the dynamic range specification 126.

Figure 14:
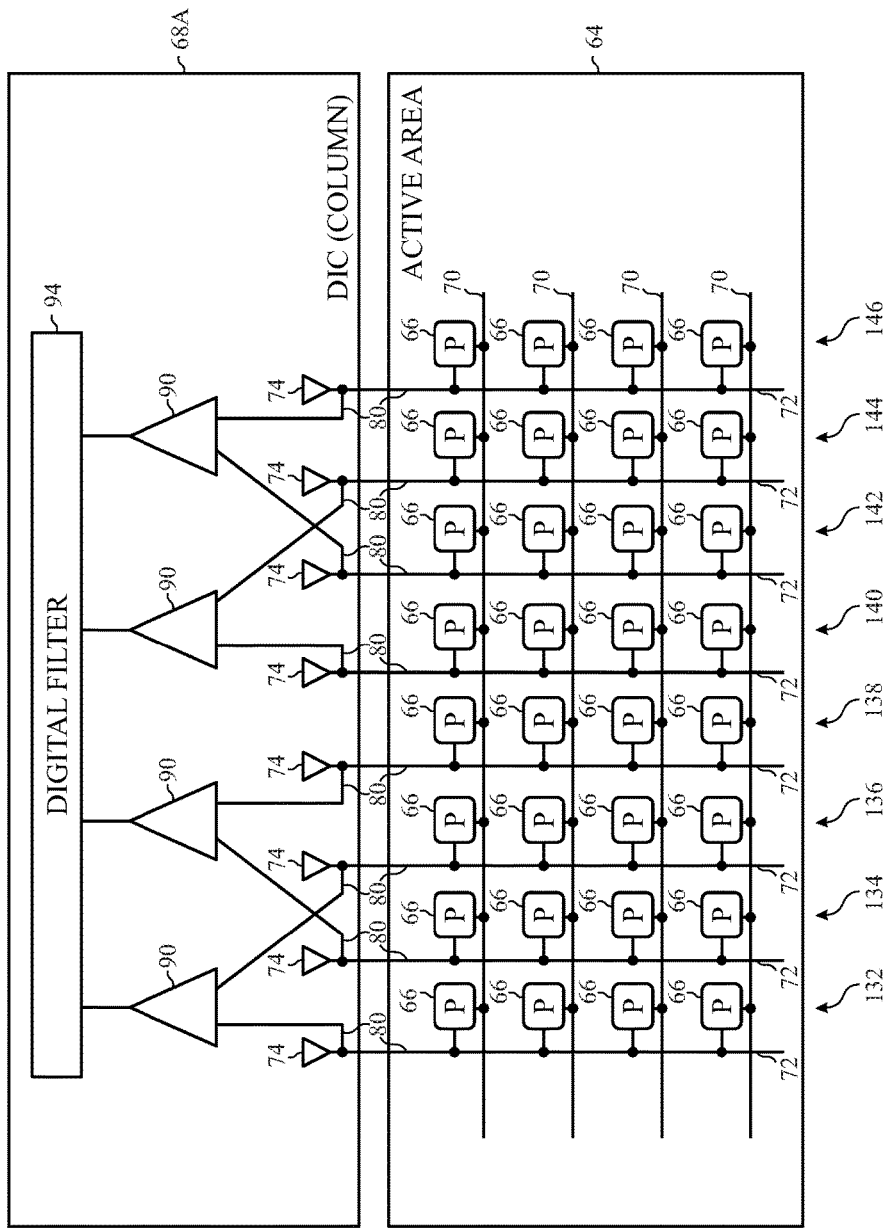
FIG. 14 is a block diagram of differential sensing of non-adjacent columns of pixels, in accordance with an embodiment.
Figure 15:
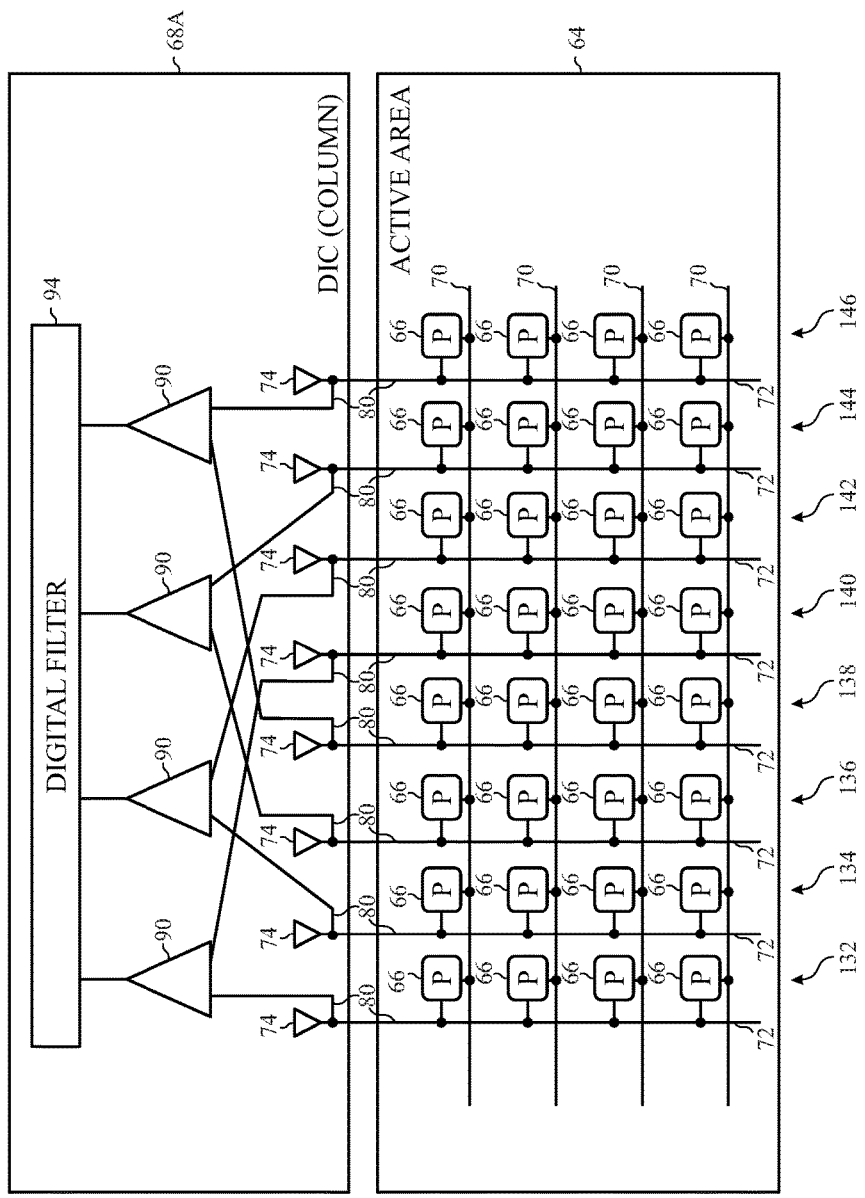
FIG. 15 is a block diagram of another example of differential sensing of other non-adjacent columns of pixels, in accordance with an embodiment.

Differential sensing may take place by comparing a test pixel 66 from one column with a reference pixel 66 from any other suitable column. For example, as shown in FIG. 14, the sense amplifiers 90 may differentially sense pixels 66 in relation to columns with similar electrical characteristics. In this example, even columns have electrical characteristics more similar to other even columns, and odd columns have electrical characteristics more similar to other odd columns. Here, for instance, the column 132 may be differentially sensed with column 136, the column 140 may be differentially sensed with column 144, the column 134 may be differentially sensed with column 138, and column 142 may be differentially sensed with column 146. This approach may improve the signal quality when the electrical characteristics of the sense lines 80 of even columns are more similar to those of sense lines 80 of other even columns, and the electrical characteristics of the sense lines 80 of odd columns are more similar to those of sense lines 80 of other odd columns. This may be the case for an RGBG configuration, in which even columns have red or blue pixels and odd columns have green pixels and, as a result, the electrical characteristics of the even columns may differ somewhat from the electrical characteristics of the odd columns. In other examples, the sense amplifiers 90 may differentially sense test pixels 66 in comparison to reference pixels 66 from every third column or, as shown in FIG. 15, every fourth column. It should be appreciated that the configuration of FIG. 15 may be particularly useful when every fourth column is more electrically similar to one another than to other columns.

Figure 16:
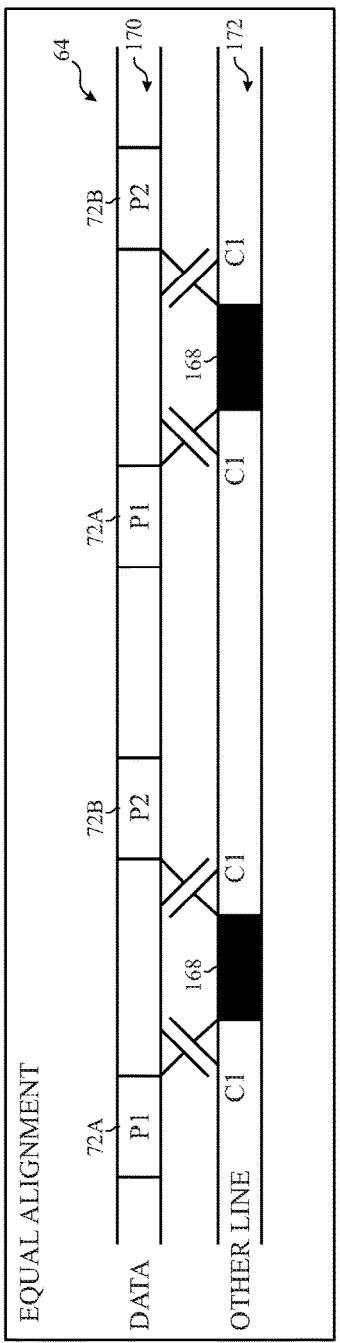
FIG. 16 is a diagram showing capacitances on data lines used as sense lines of the electronic display when the data lines are equally aligned with another conductive line of the electronic display, in accordance with an embodiment.
Figure 17:
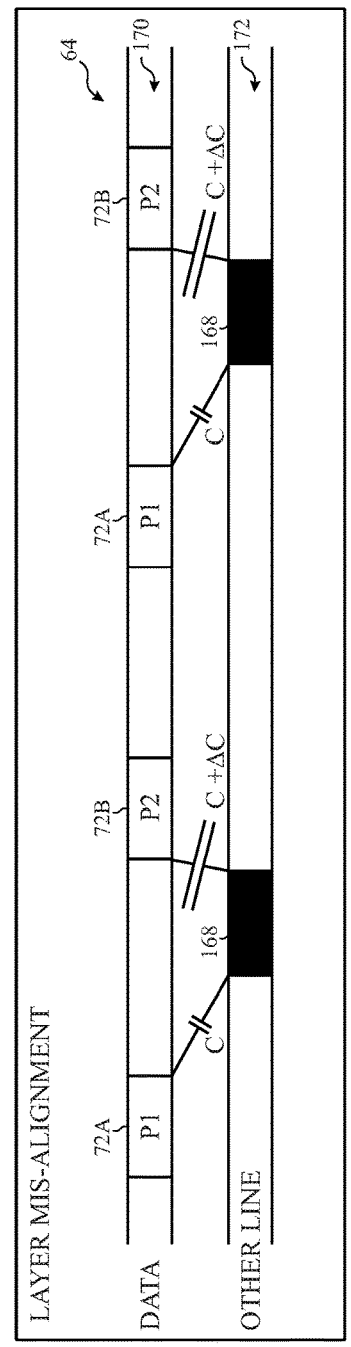
FIG. 17 shows differences in capacitance on the data lines used as sense lines when the other conductive line is misaligned between the data lines, in accordance with an embodiment.

One reason different electrical characteristics could occur on the sense lines 80 of different columns of pixels 66 is illustrated by FIGS. 16 and 17. As shown in FIG. 16, when the sense lines 80 are represented by the data lines 72, a first data line 72A and a second data line 72B (which may be associated with different colors of pixels or different pixel arrangements) may share the same capacitance $C_1$ with another conductive line 168 in the active area 64 of the electronic display 18 because the other line 168 is aligned equally between the data lines 72A and 72B. The other line 168 may be any other conductive line, such as a power supply line like a high or low voltage rail for electroluminance of the pixels 166 (e.g., VDDEL or VSSEL). Here, the data lines 72A and 72B appear in one layer 170, while the conductive line 168 appears in a different layer 172. Being in two separate layers 170 and 172, the data lines 72A and 72B may be fabricated at a different step in the manufacturing process from the conductive line 168. Thus, it is possible for the layers to be misaligned when the electronic display 18 is fabricated.

Such layer misalignment is shown in FIG. 17. In the example of FIG. 17, the conductive line 168 is shown to be farther from the first data line 72A and closer to the second data line 72B. This produces an unequal capacitance between the first data line 72A and the conductive line 168 in comparison to the second data line 72B and the conductive line 168. These are shown as a capacitance C on the data line 72A and a capacitance C+ΔC on the data line 72B.

These different capacitances on the data lines 72A compared to 72B suggest that differential sensing may be enhanced by differentially sensing a data line 72A with another data line 72A, and sensing a data line 72B with another data line 72B. When there are an even number of electrically similar data lines 72A and an even number of electrically similar data lines 72B, differential sensing can take place in the manner described above with reference to FIG. 14. An odd number of electrically similar data lines 72A or an odd numbers of electrically similar data lines 72B, however, may introduce challenges. Indeed, when each electrically similar data line 72A is differentially sensed with one other electrically similar data line 72A, that would leave one remaining data line 72A that is not differentially sensed with another electrically similar data line 72A. The same would be true for the electrically similar data lines 72B.

Figure 18:
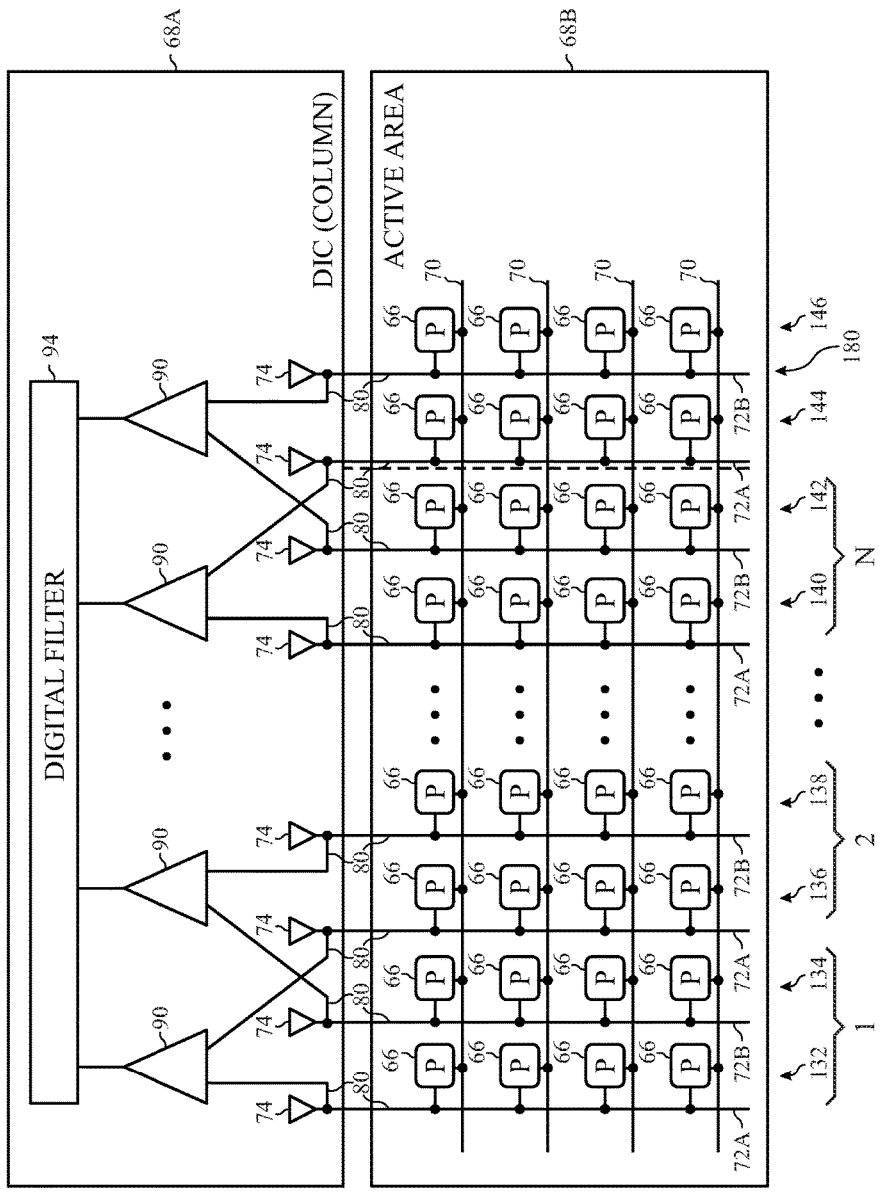
FIG. 18 is a block diagram of differential sensing of an odd number of electrically similar columns by including a dummy column, in accordance with an embodiment.

A few approaches to differential sensing that can accommodate an odd number of electrically similar data lines 72A or 72B are described with reference to the subsequent drawings. Namely, as shown in FIG. 18, there may be an odd number of groups of columns 132 and 134 that are coupled respectively to data lines 72A and 72B. In this example, there are N groups of columns 132 and 134, where N is an odd number. As a result, there may be one remaining group of columns 132 and 134 on the active area 64 that are not able to be sensed differentially with another respective column 132 or 134 on the active area 64. Accordingly, the approach of FIG. 18 adds dummy columns 180 that includes additional dummy circuitry that will not be used to actively display image data (e.g., may be disposed outside of a portion of the active area 64 that will be visible). The dummy columns 180 include a dummy data line 72A that can be differentially sensed with the last data line 72A of the Nth column, and a dummy data line 72B that can be differentially sensed with the data line 72B of the Nth column. In this way, differential sensing may be used, even for an active area 64 that includes an odd number of electrically similar columns for display.

Figure 19:
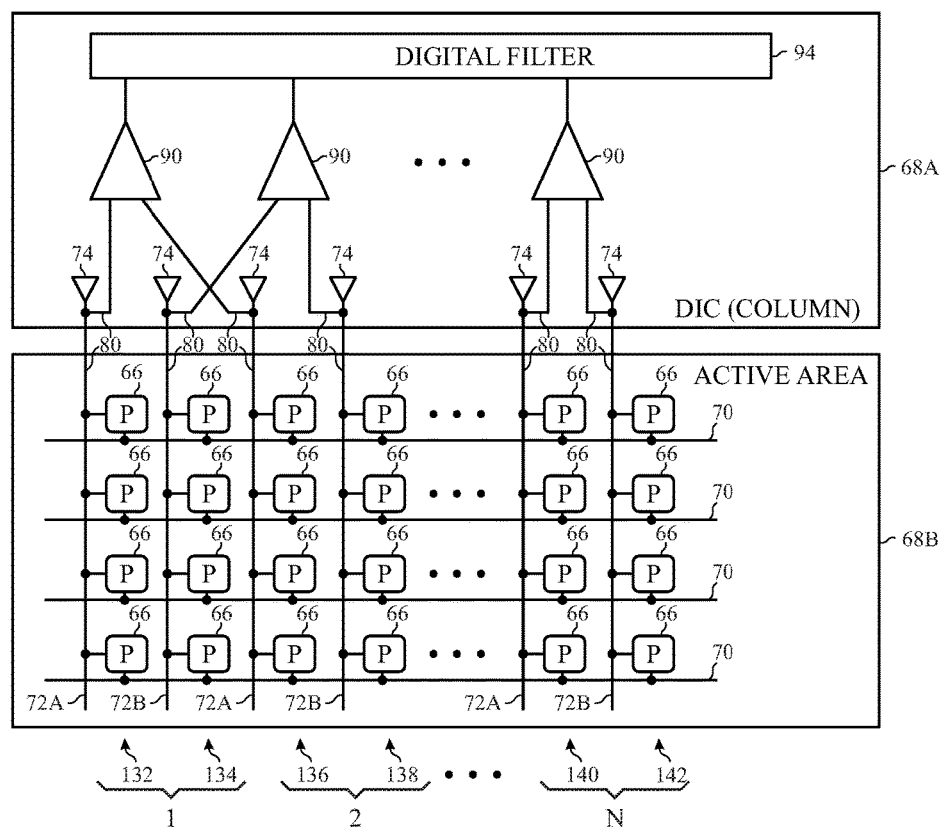
FIG. 19 is a block diagram of differential sensing of an odd number of electrically similar columns using a dedicated sensing channel for edge columns, in accordance with an embodiment.

Another example is shown in FIG. 19, which does not include any dummy data lines 72A or 72B, but rather differentially senses the final columns 132 and 134 of the Nth column together. Although the data lines 72A and 72B of the Nth group of columns are not entirely electrically similar, this may at least permit differential sensing to occur when the number of electrically similar columns of the active area 64 is an odd number.

Figure 20:
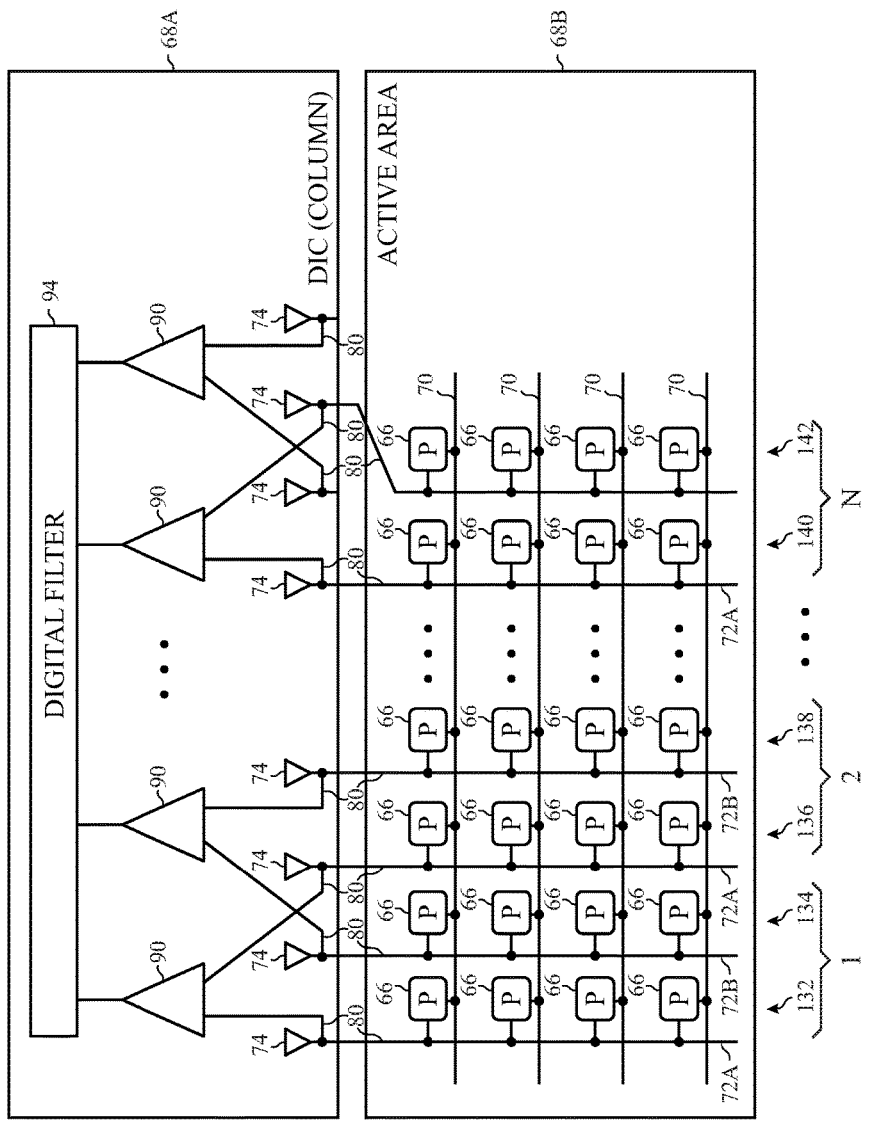
FIG. 20 is a block diagram of differential sensing of electrically similar columns with swapped sensing connections, in accordance with an embodiment.
Figure 21:
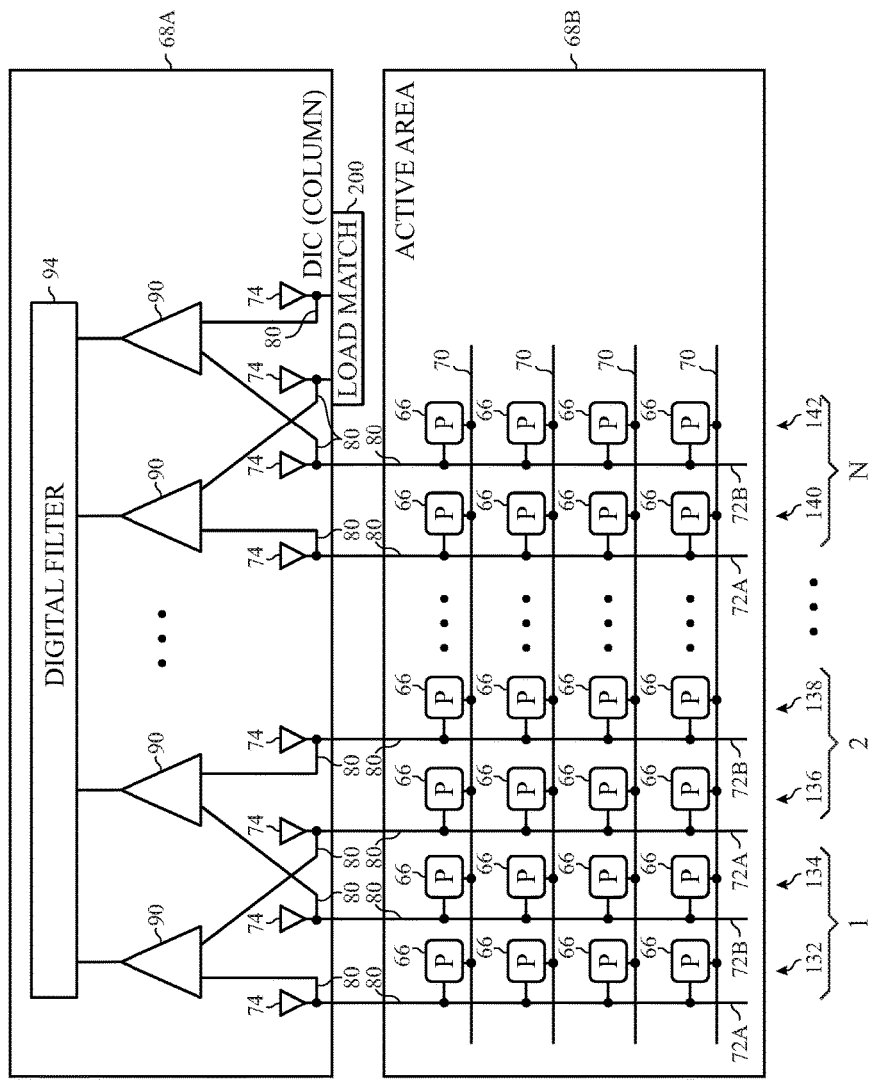
FIG. 21 is a block diagram of differential sensing of an odd number of electrically similar columns using load matching, in accordance with an embodiment.

A variation of the circuitry of FIG. 19 may involve maintaining a common differential sensing structure, but may use a different form of sensing routing, as shown in FIG. 20. Here, electrical variations in the driver integrated circuit 68 in the form of differential sensing used for groups of columns 1, 2, and so forth may be involve the same additional circuitry 190 for Nth group of columns. Additionally or alternatively, load matching may be applied to enable differential sensing for an odd number N groups of columns, as shown in FIG. 21. Indeed, in FIG. 21, the driver integrated circuit 68 may include differential sensing circuitry, such as the sense amplifiers 90, coupled to load matching circuitry 200. The load matching circuitry 200 may apply a load to have roughly the same electrical characteristics as the column 72A when the column 72A of the Nth group of columns is differentially sensed, and to apply a capacitance of roughly the same capacitance as the data line 72B when the data line 72B of the Nth group of columns is differentially sensed.

Figure 22:
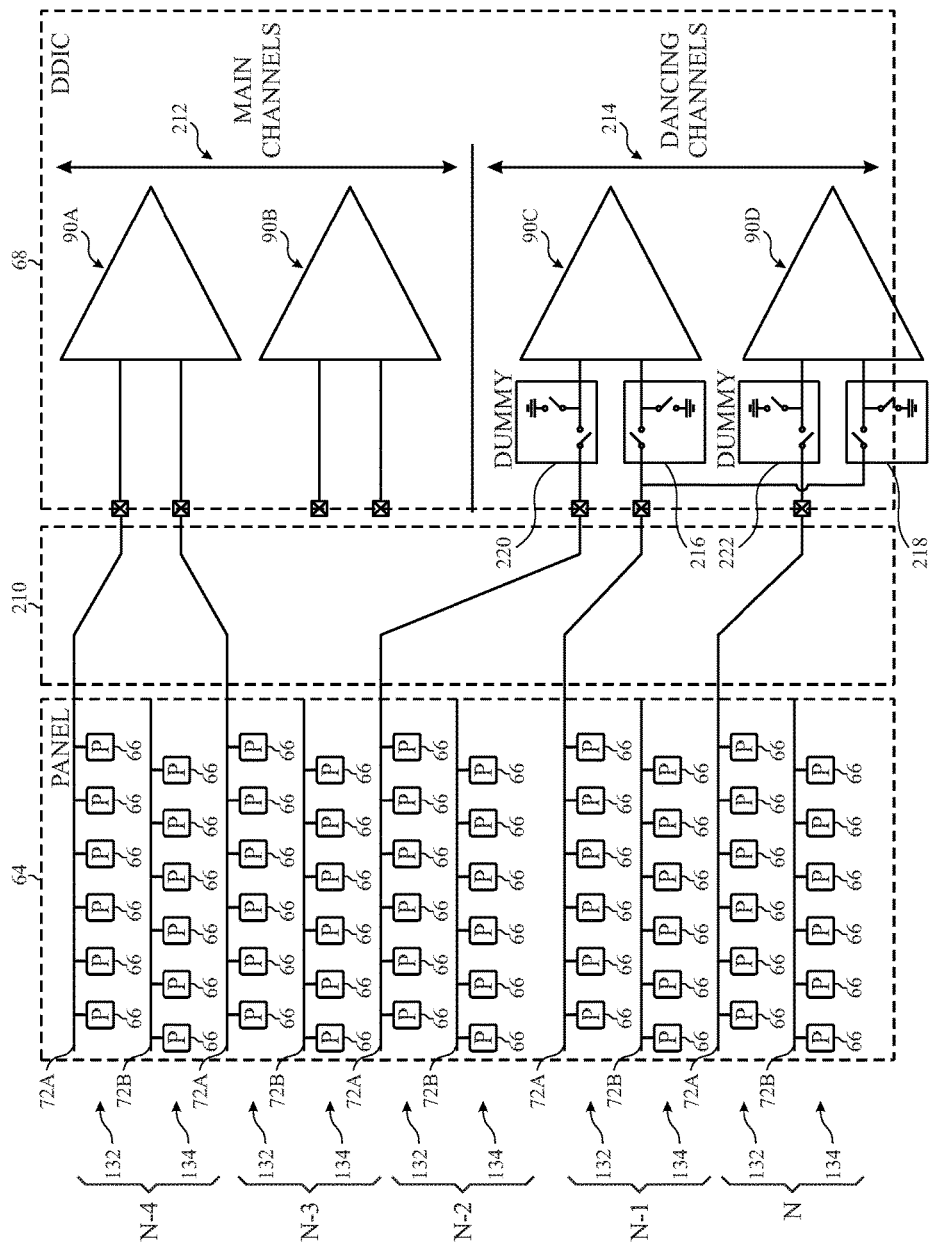
FIG. 22 is a block diagram of differential sensing of an odd number of electrically similar columns using dancing channels, in accordance with an embodiment.

Another manner of differentially sensing an odd number of electrically similar columns is shown in FIG. 22. In FIG. 22, the active area 64 is connected to the display driver integrated circuit 68 through routing circuitry 210. The routing circuitry 210 may be a chip-on-flex (COF) interconnection, or any other suitable routing circuitry to connect the driver integrated circuit 68 to the active area 64 of the electronic display 18. The sensing circuitry of the driver integrated circuit 68 may be connected to a first number of fixed channels 212 and a second number of dancing channels 214.

When the active area 64 of the electronic display 18 includes an even number of electrically similar columns, such as an even number of data lines 72A and even number of data lines 72B, the routing circuitry 210 may route all of the columns to the main fixed channels 212. When the active area 64 of the electronic display 18 includes an odd number N of the data lines 72A or 72B, the routing circuitry 210 may route at least three of each of the data lines 72A and at least three of the 72B to the dancing channels 214. In this example, the electronic display 18 includes an active area 64 with in N odd groups of columns, each of which includes two data lines 72A and 72B that are more electrically similarly to other respective data lines 72A and 72B than to each other (i.e., a data line 72A may be more electrically similar to another data line 72A, and a data line 72B may be more electrically similar to another data line 72B). For ease of explanation, only sense amplifiers 90A, 90B, 90C, and 90D that are used to sense the data lines 72A are shown. However, it should be understood that similar circuitry may be used to differentially sense the other electrically similar data lines 72B. Here, the last three groups of columns N, N-1, and N-2 are routed to the dancing channels 214.

The dancing channels 214 allow differential sensing of the odd number of electrically similar using switches 216 and 218. The switches 216 and 218 may be used to selectively route the data line 72A from the N-1 group of columns to the sense amplifier 90C for comparison with (1) the data line 72A from the N-2 group of columns or (2) the sense amplifier 90D for comparison with the data line 72A from the N group of columns. Dummy switches 220 and 222 may be provided for load-matching purposes to offset the loading effects of the switches 216 and 218.

Figure 23:
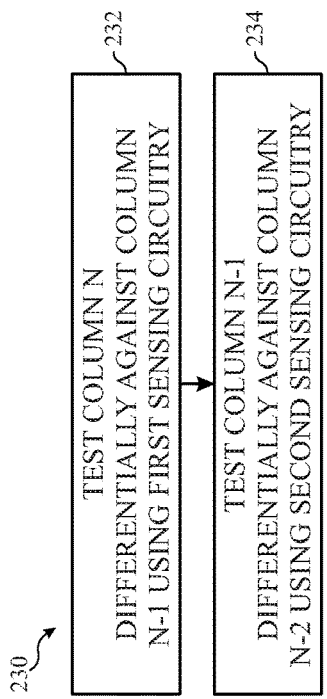
FIG. 23 is a flowchart of a method for differential sensing using the dancing channels of FIG. 22, in accordance with an embodiment.

Thus, the dancing channels 214 shown in FIG. 22 may allow each of the odd number N of electrically similar channels 72A to be differentially sensed with another electrically similar channel 72A, as described by a flowchart 230 shown in FIG. 23. Namely, at one point in time, the data lines 72A from column N may be differentially sensed against the data line 72A from column N-1 using first sensing circuitry (e.g., sense amplifier 90D) (block 232). The data line 72A from column N-1 may be differentially tested against the data line 72A of column N-2 using second sensing circuitry (e.g., sense amplifier 90C) (block 234).

Figure 24:
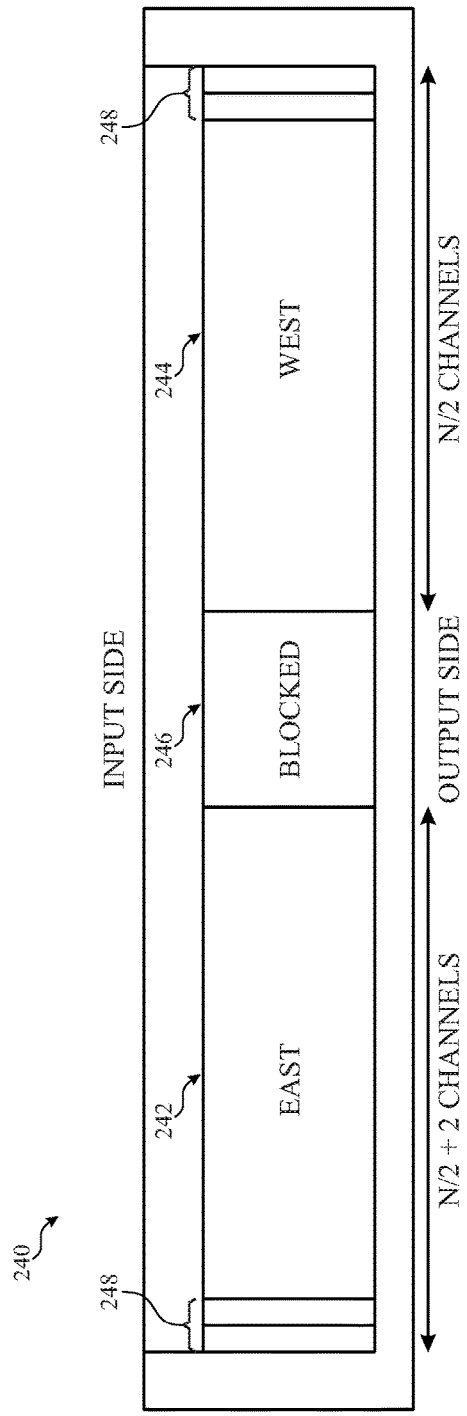
FIG. 24 is a block diagram of a channel layout that includes dancing channels, in accordance with an embodiment.

The dancing channels shown in FIG. 22 may be located on a display driver channel configuration 240 as shown in FIG. 24. In FIG. 24, active east channels 242 are equal in number to N/2+2 total channels, while active west channels 244 encompass N/2 channels. A space of unused channels 246 may be included when fewer total channels are used than all of the channels that may be available on the driver integrated circuit. Channels 248 represent the dancing channels 214. Here, the dancing channels 248 may appear as part of both the east channels 242 and the west channels 244 to maintain loading similarity.

Figure 25:
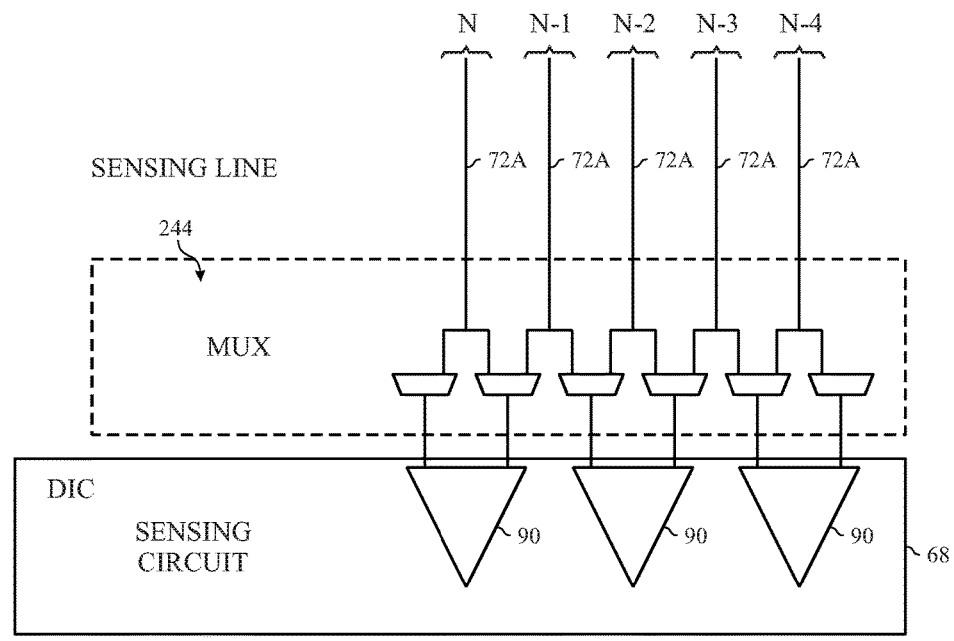
FIG. 25 is a circuit diagram for dancing channels for voltage sensing, in accordance with an embodiment.

FIG. 25 represents an example of dancing channels that may occur over a wider portion of the active area 64 of the electronic display 18. Indeed, the dancing channels may have access to data lines 72 from the entire active area 64. Furthermore, while the example shown in FIG. 25 relates to voltage sensing, it should be appreciated that, in other examples, current sensing may be used instead. The circuitry of FIG. 25 includes the sensing circuitry of the driver integrated circuit 68, which includes a number of differential sense amplifiers 90 that are coupled to selection circuitry 260. The selection circuitry 260 may be part of the driver integrated circuit 68, or may be located on the active area 64, or may be located on routing circuitry between the driver integrated circuit 68 and the active area 64, or may be distributed across these locations. The selection circuitry 260 enables electrically similar data lines 72A to be sensed in combination with neighboring electrically similar data lines 72A at different points in time. For example, at one time, data lines 72A from columns N and N-1 may be differentially sensed, data lines 72A from columns N-2 and N-3 may be sensed. At another time, data lines from columns N-1 and N-2 may be differentially sensed, and the data lines 72A from columns N-3 and N-4 may be differentially sensed, and so forth.

Figure 26:
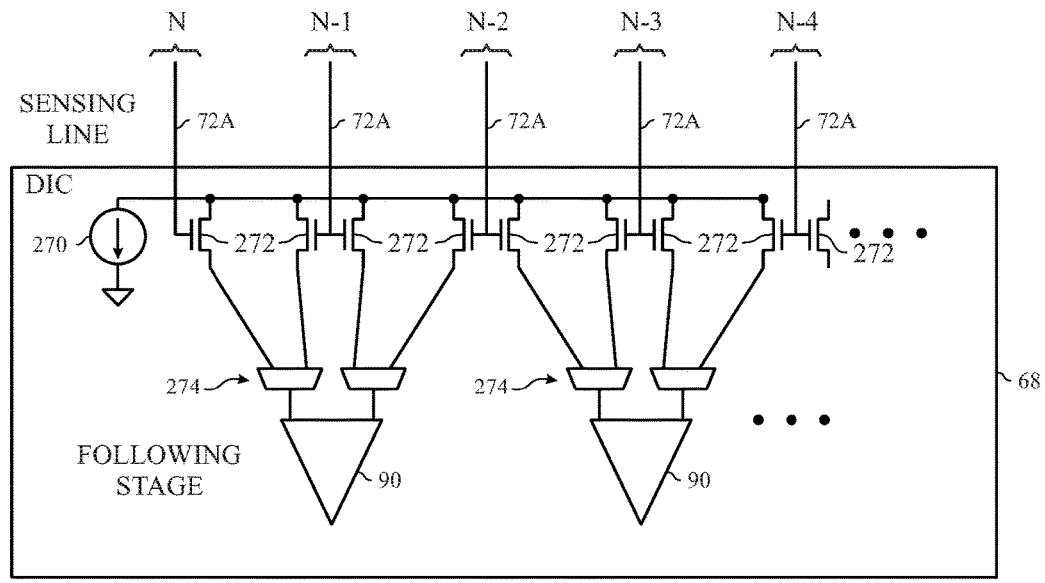
FIG. 26 is a circuit diagram of dancing channels for current sensing, in accordance with an embodiment.

An example of dancing channels that use current sensing is shown in FIG. 26. In the example of FIG. 26, electrically similar data lines 72A from 5 columns N, N-1, N-2, N-3, and N-4 are shown. It should be appreciated that any suitable number of data lines 72A may be used and this pattern may repeat any suitable number of times as desired. A current source 270 is applied to sense transistors 272 that sense the signal on the electrically similar data lines 72A. A variable amount of the current signal from the current source 270 passes through the sense transistors 272 onto selection circuitry 274. The selection circuitry 274 may be used to select which of the electrically similar data lines 72A are differentially sensed. Indeed, in the circuitry of FIG. 26, the selection circuitry 274 may allow:
  a. the data line 72A from the column N to be differentially sensed with either of the data lines 72A from columns N-1 or N-2;
  b. the data line 72A from the column N-1 to be differentially sensed with either of the data lines 72A from columns N or N-2; and
  c. the data line 72A from the column N-2 to be differentially sensed with either of the data lines 72A from columns N or N-1 or from columns N-3 or N-4.

The pattern shown in FIG. 26 may continue across channels from the entire display active area 64.

Figure 27:
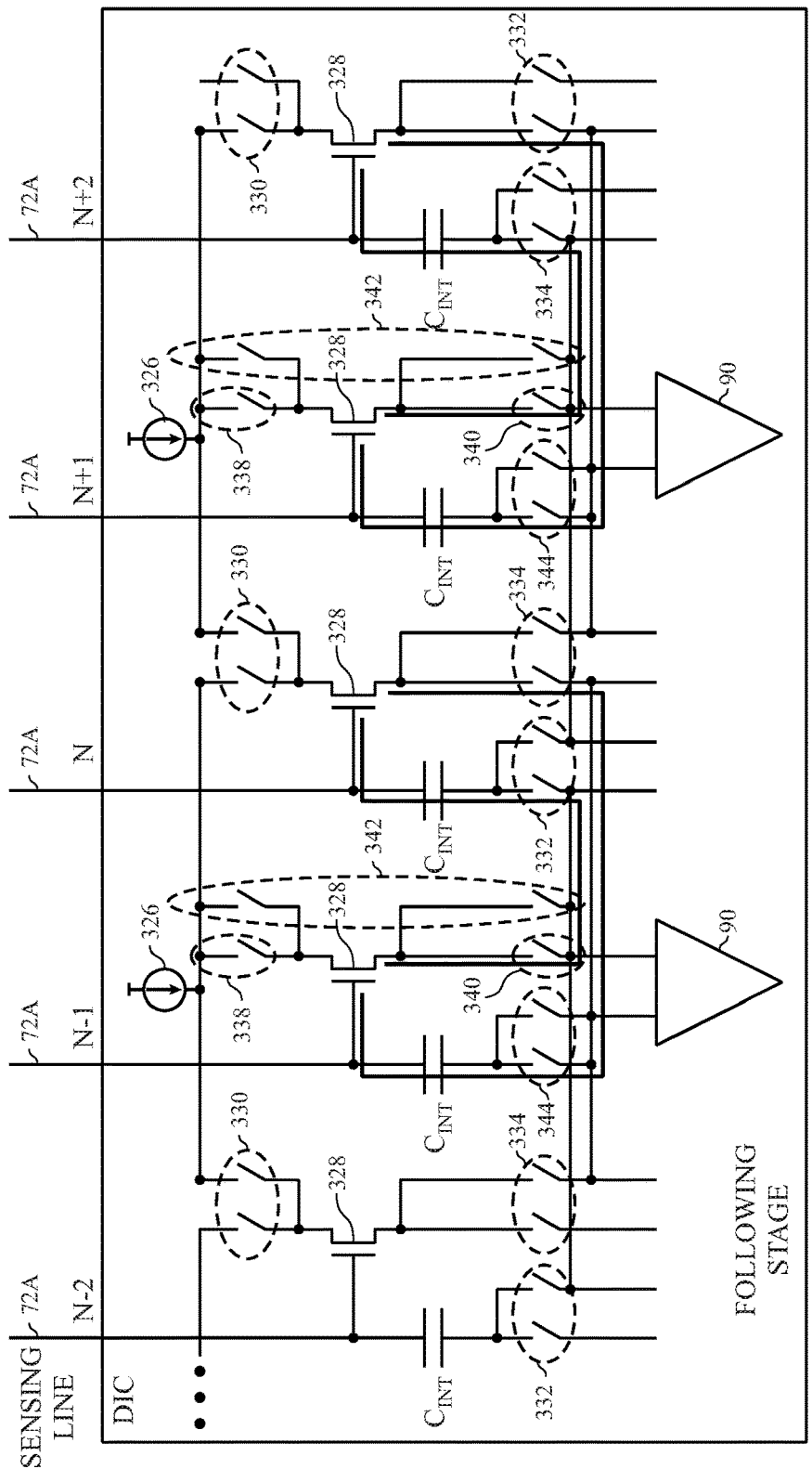
FIG. 27 is a circuit diagram of full display dancing channels, in accordance with an embodiment.

Dancing channels shown in FIG. 27 are implemented with slightly different circuitry. In this example, each data line 72A from a number of columns N-2, N-1, N are coupled into sensing circuitry that uses current sensing based on one current source 326, and data lines 72A from columns N, N+1, N+2, are coupled into another current source 326. Sense transistors 328 may differentially sense the signals of two of the data lines 72A as routed by the selection circuitry of FIG. 27, which will be described further below, based on the current source 326 and an integration capacitance $C_{INT}$. For instance, switches 330, 332, and 334 allow the data line 72A of column N to be differentially sensed with the data line 72A of column N-1 or the data line 72A of column N+1, as well as to pass further signals down to following stages of differential sensing with other columns beyond those shown in FIG. 27. Switches 338, 340, 342, and 344 may operate as either dummy switches or to pass signals down to the following stages.

Figure 28:
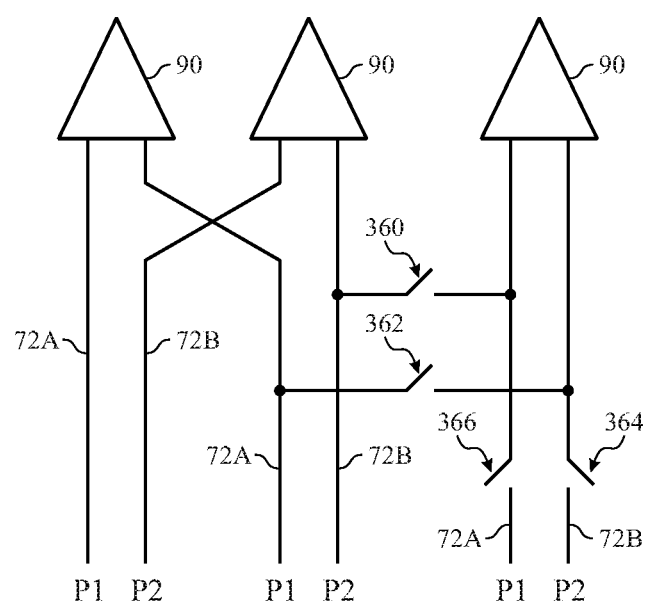
FIG. 28 is another of example of dancing channels at an edge of a display with an odd number of electrically similar columns, in accordance with an embodiment.

FIG. 28 represents an example of dancing channels as applied shown in FIG. 27 are implemented to the last, odd group of electrically similar columns. In FIG. 28, P1 represents a first type of pixels that may be present on the data line 72A (e.g., red pixels and blue pixels), and P2 represents pixels that may be found on the data line 72B (e.g., green pixels). A final sense amplifier 90 may selectively differentially sense different electrically similar data lines 72 using switches 360, 362, 364, and 366. The last electrically similar data line 72A may be differentially sensed with the second-to-last data line 72A by opening the switches 360 and 364 and closing the switches 362 and 366 The last electrically similar data line 72B may be differentially sensed with the second-to-last data line 72B by closing the switches 360 and 364 and opening the switches 362 and 366.

Figure 29:
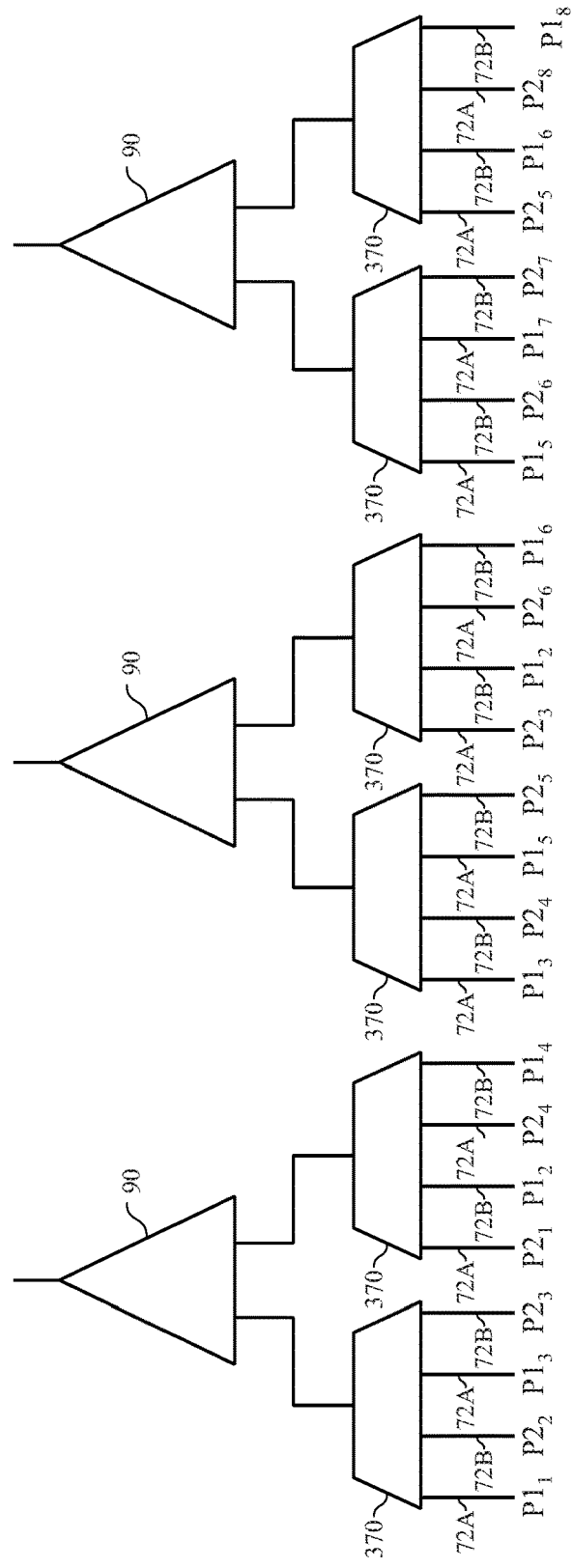
FIG. 29 is a block diagram of dancing channels that can differentially sense columns between two groups of electrically similar columns.

An example of dancing channels shown in FIG. 29 may enable an even greater number of differential sensing patterns. Here, differential sense amplifiers 90 are coupled to selection circuitry 370, each of which has four inputs. In the example of FIG. 29, the four inputs include data lines 72 from with both electrically similar and electrically dissimilar characteristics. For example, in the example of FIG. 29, a first selection circuitry 270 may selectively allow a signal to be sensed from a first column of a pixel of a first type ($P1_1$) (e.g., alternating rows of red pixels and blue pixels), a second column of a pixel of a second type ($P2_2$) (e.g., rows of second green pixels), a third column of a pixel of the first type ($P1_3$) (e.g., alternating rows of red pixels and blue pixels), and a third column of a pixel of a second type ($P2_3$) (e.g., rows of first green pixels), and a second selection circuitry 270 may selectively allow a signal to be sensed from a first column of a pixel of the second type ($P2_1$) (e.g., rows of first green pixels), a second column of a pixel of the first type ($P1_2$) (e.g., alternating rows of blue and red pixels), a fourth column of a pixel of the second type ($P2_4$) (e.g., rows of the second green pixels), and a fourth column of a pixel of the first type ($P1_4$) (e.g., alternating rows of blue and red pixels), which may be done for a red-green-blue-green (RGBG) pixel arrangement on the active area 64 of the electronic display 18. Similar arrangements are coupled to other sense amplifiers 90. In effect, this may allow a given column of pixels to be sensed with a wide variety of other columns of pixels as desired. It should be appreciated that the arrangement shown in FIG. 29 is provided by way of example, and that many other arrangements may be used. Indeed, in another example, each selection circuitry 270 may include three inputs, and fewer columns of pixels may be differentially sensed in relation to each other, or may include more than four inputs, and more columns of pixels may be differentially sensed in relation to each other.

The specific embodiments described above have been shown by way of example, and it should be understood that these embodiments may be susceptible to various modifications and alternative forms. For example, while differential sensing has been described with reference to sense lines that are also data lines having electrically similar characteristics, it should be appreciated that the sense lines may be any other conductive lines on the electronic display having electrically similar characteristics. It should be further understood that the claims are not intended to be limited to the particular forms disclosed, but rather to cover all modifications, equivalents, and alternatives falling within the spirit and scope of this disclosure.

What is claimed is:

1. An electronic device comprising:
  processing circuitry configured to generate image data based at least in part on display panel sense feedback; and
  an electronic display configured to display the image data on pixels coupled to one of a plurality of sense lines on an active area of the electronic display, wherein the active area comprises first sense lines of the plurality of sense lines having first common electrical characteristics, wherein a total number of the first sense lines is odd, and wherein the electronic display is configured to obtain the display panel sense feedback at least in part by differentially sensing each one of the first sense lines with another one of the first sense lines.

2. The electronic device of claim 1, wherein the active area comprises an odd number of second sense lines of the plurality of sense lines having second common electrical characteristics, and wherein the electronic display is configured to obtain the display panel sense feedback at least in part by differentially sensing each one of the second sense lines with another one of the second sense lines.

3. The electronic device of claim 1, wherein the first common electrical characteristics comprise a common capacitance between each of the first sense lines and a respective plurality of other conductive lines of the electronic display.

4. The electronic device of claim 1, wherein each of the plurality of sense lines doubles as a data line of the electronic display.

5. The electronic device of claim 1, wherein the first sense lines of the plurality of sense lines comprises a multiple of adjacent sense lines.

6. The electronic device of claim 5, wherein the first sense lines of the plurality of sense lines comprise every other adjacent sense line of the plurality of sense lines.

7. The electronic device of claim 1, wherein the electronic display is configured to obtain the display panel sense feedback at least in part by differentially sensing, at a first time, at least a first one of the first sense lines with a second one of the first sense lines, and differentially sensing, at a second time, at least the first one of the first sense lines with a third one of the first sense lines.

8. The electronic device of claim 7, wherein each of the first sense lines comprises a data line of a plurality of data lines of the electronic display, wherein the plurality of data lines are arranged in columns, and wherein the first one of the first sense lines is in a second-to-last one of the columns.

9. A method for display panel sensing comprising:
differentially sensing a first sense line of an electronic display in comparison to a second sense line of the electronic display;
differentially sensing the first sense line of the electronic display in comparison to a third sense line of the electronic display; and
producing compensated image data for display on the electronic display based at least in part on the differential sensing.

10. The method of claim 9, wherein:
differentially sensing the first sense line in comparison to the second sense line comprises coupling the first sense line and the second sense line to a first differential amplifier; and
differentially sensing the first sense line in comparison to the third sense line comprises coupling the first sense line and the third sense line to a second differential amplifier.

11. The method of claim 10, wherein:
coupling the first sense line and the second sense line to the first differential amplifier comprises selectively switching the first sense line to the first differential amplifier; and
coupling the first sense line and the third sense line to the second differential amplifier comprises selectively switching the first sense line to the second differential amplifier.

12. The method of claim 10, wherein:
coupling the first sense line and the second sense line to the first differential amplifier comprises selectively switching the first sense line to the first differential amplifier by through a first switch closing the first switch and opening a second switch and coupling the second sense line to the first differential amplifier through a first dummy switch; and
coupling the first sense line and the third sense line to the second differential amplifier comprises selectively switching the first sense line to the second differential amplifier through the second switch by closing the second switch and opening the first switch and coupling the third sense line to the second differential amplifier through a second dummy switch.

13. The method of claim 9, comprising differentially sensing the second sense line of the electronic display in comparison to the third sense line of the electronic display.

14. The method of claim 9, comprising differentially sensing the first sense line of the electronic display in comparison to a fourth sense line of the electronic display.

15. The method of claim 9, wherein the first sense line, the second sense line, and the third sense line are each one of a plurality of sense lines of the electronic display of total is odd in number.

16. An electronic display comprising:
an active area comprising pixels connected to one of a plurality of sense lines; and
a display driver integrated circuit comprising a plurality of sense channels configured to differentially sense the plurality of sense lines, wherein at least a portion of the plurality of sense channels comprises dancing channels that are configured to differentially sense different sense lines at different times;
wherein the plurality of sense lines comprises an odd number of sense lines having first common electrical characteristics, wherein the dancing channels are configured to differentially sense a first sense line and a second sense line having the first common electrical characteristics at a first time and differentially sense the first sense line and a third sense line having second common electrical characteristics at a second time.

17. The electronic display of claim 16, wherein each of the plurality of sense lines doubles as a data line of the electronic display.

18. The electronic display of claim 16, wherein the dancing channels comprise differential sense amplifiers coupled to selection circuitry, wherein the selection circuitry is configured to route different sense lines to different differential sense amplifiers at different times.

19. The electronic display of claim 16, wherein at least the portion of the plurality of sense channels that comprises the dancing channels includes all of the plurality of sense channels.

* * * * *